(12) United States Patent
Ueda

(10) Patent No.: US 7,580,724 B2
(45) Date of Patent: Aug. 25, 2009

(54) COMMUNICATION SYSTEM, COMMUNICATION METHOD, AND PROGRAM THEREOF

(75) Inventor: Yasuto Ueda, Tokyo (JP)

(73) Assignee: Office Misumi Co., Ltd., Miyagi (JP)

( * ) Notice: Subject to any disclaimer, the term of this patent is extended or adjusted under 35 U.S.C. 154(b) by 233 days.

(21) Appl. No.: 10/549,973

(22) PCT Filed: Mar. 19, 2004

(86) PCT No.: PCT/JP2004/003711

§ 371 (c)(1),
(2), (4) Date: Sep. 20, 2005

(87) PCT Pub. No.: WO2004/084080

PCT Pub. Date: Sep. 30, 2004

(65) Prior Publication Data

US 2006/0089168 A1    Apr. 27, 2006

(30) Foreign Application Priority Data

| Mar. 20, 2003 | (JP) | ............................. 2003-077615 |
| Apr. 30, 2003 | (JP) | ............................. 2003-125949 |
| Mar. 17, 2004 | (JP) | ............................. 2004-076066 |

(51) Int. Cl.
*G06F 15/16* (2006.01)

(52) U.S. Cl. .................................. 455/550.1; 370/329

(58) Field of Classification Search ............ 340/825.49, 340/573.1, 825.36, 539.13, 539.14
See application file for complete search history.

(56) References Cited

U.S. PATENT DOCUMENTS

2003/0122684 A1 * 7/2003 Porter et al. ............. 340/686.6

FOREIGN PATENT DOCUMENTS

| JP | 11-346389 | 12/1999 |
| JP | 2000-187787 | 7/2000 |
| JP | 2000-235569 | 8/2000 |
| JP | 2000-287265 | 10/2000 |
| JP | 2001-283351 | 10/2001 |
| JP | 2001-306589 | 11/2001 |
| JP | 2002-46821 | 2/2002 |
| JP | 2002-163301 | 6/2002 |
| JP | 2002-169736 | 6/2002 |
| JP | 2002-183693 | 6/2002 |
| JP | 2002-216086 | 8/2002 |
| JP | 2002-223478 | 8/2002 |
| JP | 2002-281148 | 9/2002 |
| JP | 2002-298122 | 10/2002 |

* cited by examiner

*Primary Examiner*—Sam Bhattacharya
(74) *Attorney, Agent, or Firm*—D. Peter Hochberg; Sean F. Mellino; Daniel J. Smola

(57) ABSTRACT

A communication system, a communication method and program thereof capable of easily constructing a system in which communication between an IC tag and a mobile information terminal having a built-in or externally-attached reader/writer is used. URL information in the Web page for disclosing personal information stored on the IC tag is read by the reader/writer and the information is accessed. A security system is provided in which an alarm is performed for preventing losing an article according to the communication state between the IC tag and the reader/writer, and if an article is lost, its position information can be checked by a mobile information terminal or another terminal device.

19 Claims, 18 Drawing Sheets

FIG. 5

| PRIVATE PAGE | BUSINESS PAGE |
|---|---|
| Text page | Text page |
| ☐ Name | ☐ Company name |
| ☐ Kana | ☐ Kana |
| ☐ Sexuality | ☐ Position |
| ☐ Date of Birth | ☐ Title |
| ☐ Zip Code | ☐ Name |
| ☐ Mourning information | ☐ Kana |
| ☐ Address 1 | ☐ Zip code |
| ☐ Address 2 | ☐ Address 1 |
| ☐ Mobile mail address | ☐ Address 2 |
| ■ Telephone number | ☐ Telephone number |
| ■ Facsimile number | ☐ Facsimile number |
| ■ Mobile phone number | ☐ Mobile phone number |
| ■ PC mail address | ☐ Mobile mail address |
| ■ Blood type | ■ Map |
| ■ Constellation | ■ PC mail address |
| ■ Family information | ■ Summary of business |
| ■ Boyfriend or Girlfriend | ■ Business in charge |
| ■ Favorite point of other sex | ■ Introduction of personal history |
| ■ Sales point | ■ Appeal point |
| ■ Hobby | |
| ■ Name of school, grade, club | Bulletin board page |
| ■ Favorite food | ■ Latest news |
| ■ Unfavorite food | |
| ■ Things you need | Picture page |
| ■ Recent impressive music or book | ■ My picture |
| ■ Recent trouble | ■ Company appearance picture |
| ■ Memory | ■ Business result's picture 1 |
| ■ My secret 1 | ■ Business result's picture 2 |
| ■ My secret 2 | ■ Business result's picture 3 |
| ■ My secret 3 | |
| | Voice Page |
| Bulletin board page | ■ Greetings |
| ■ Latest events | |
| Picture page | |
| ■ My picture 1 | |
| ■ My picture 2 | |
| ■ My picture 3 | |
| ■ My picture 4 | |
| ■ My picture 5 | |
| Voice Page | |
| ■ Greetings | |

BLANK SQUARE "☐" SHOWN ABOVE IS ESSENTIAL INPUT TERM.
BLACK SQUARE "■" SHOWN ABOVE IS ARBITRARY INPUT TERM.

FIG. 6

```
INFORMATION INPUT PAGE

●NAME
    [            ]

●ADDRESS
    [            ]

●TELEPHONE NO.
    [            ]

( REGISTRATION )
```

FIG. 8

PRIVATE PAGE

Text page
- □Name
- ○Kana
- □Sexuality
- ○Date of Birth
- ○Zip Code
- ○Mourning information
- ○Address 1
- ○Address 2
- □Mobile mail address
- ○Telephone number
- ○Facsimile number
- ○Mobile phone number
- ○PC mail address
- ○Blood type
- ○Constellation
- ○Family information
- □Boyfriend or Girlfriend
- □Favorite point of other sex
- □Sales point
- □Hobby
- □Name of school, grade, club
- □Favorite food
- □Unfavorite food
- □Things you need
- □Recent impressive music or book
- ○Recent trouble
- □Memory
- ◎My secret 1
- ◎My secret 2
- ◎My secret 3

Bulletin board page
- □Latest events

Picture page
- ○My picture 1
- ○My picture 2
- ○My picture 3
- ◎My picture 4
- ◎My picture 5

Voice Page
- ■Greetings

BUSINESS PAGE

Text page
- □Company name
- □Kana
- □Position
- □Title
- □Name
- □Kana
- □Zip code
- □Address 1
- □Address 2
- □Telephone number
- □Facsimile number
- □Mobile phone number
- □Mobile mail address
- □Map
- □PC mail address
- □Summary of business
- □Business in charge
- □Intoroduction of personal history
- □Appeal point

Bulletin board page
- □Latest news

Picture page
- □My picture
- □Company appearance picture
- □Business result's picture 1
- □Business result's picture 2
- □Business result's picture 3

Voice Page
- □Greetings

□DISCLOSURE LEVEL 1   ○DISCLOSURE LEVEL 2   ◎DISCLOSURE LEVEL 3

FIG. 9

| LIST OF VISITORS |
| --- |
| ● YAMADA |
| ● RYOKO |
| ● TAKUYA |
| ● AKIKO |
| ● ×××× |
| [ DELETE ] |
| [ LEVEL CHANGE ] |

(a)

DELETION REPORT

MR. OR MRS. ××××× WAS DELETED.

(b)

LEVEL CHANGE

MRS. RYOKO WAS CHANGED INTO LEVEL 3.

THING LEFT BEHIND INFORMATION

PERSONAL BELONGING (BAG) IS LEFT BEHIND.

ADDRESS INFORMATION

TIME    PM3:30

COMMUNICATION SYSTEM, COMMUNICATION METHOD, AND PROGRAM THEREOF

CROSS-REFERENCE TO RELATED APPLICATIONS

This application is a National Stage application of International Application No. PCT/JP2004/003711, filed on Mar. 19, 2004, which claims priority of Japanese application numbers 2004-076066, filed on Mar. 17, 2004, 2003-125949, filed on Apr. 30, 2003 and 2003-077615, filed on Mar. 20, 2003.

BACKGROUND OF THE INVENTION

1. Technical Field of the Invention

The present invention relates to the communication system, communication method and program thereof which is able to construct easily the security system using the information acquisition system which improves the applicability of the business card in various business scenes, or an IC tag using the business card which attached with the IC tag etc.

2. Background Art

Generally speaking, the beginning of business starts with the exchange of business cards, and it is usually common for the foundations of business.

However, many of the business cards actually distributed are only being written with a piece of information, including a title, a name, an address, a telephone number, and a e-mail address and so on in the restricted space which sizes about 9 cm×5 cm.

Since the conventional business card is not attractive, it does not pull interest from anyone. Further, once the conventional business card is kept in a card holder, it does not have utility value in the present business condition.

Recently, a different type of business cards from the conventional one appears on the market increasingly, for example, a business card of color printing or a business card containing a mug shot by development of printing technology.

However, there was a problem that it could not be freed from the conventional business card function.

Given the aspects of the design of the conventional business cards, since the space was restricted, there was a problem that the amount of information which is able to be displayed is restricted and that the information, once printed on the business card, was impossible to immediately rewrite the data printed on the business card.

In recent advancing of the technology of digitalizing of data, the technology of the electronic card notified in the form where the personal information on such as an address, a contact information, etc. is attached to an E-mail is also appearing and spreading on the market.

However, the custom of business card exchanging still exists and there was a problem that an electronic card was not what adapts itself to the present business scene immediately.

These days, RFID technology attracts attention. This RFID technology is the solid recognition technology of recognizing a data carrier with a non-contact method using an electric wave. Using the RFID technology, it provides to carry a lot of information which amounts far exceed the restricted space of the business card.

For example, JP2002-183693 is known as a united technology between the usual business card and the RFID technology as mentioned above.

However, the prior invention indicated in JP2002-183693 is to provide the device which is able to send information correctly to the destination for preventing the reading error of the partner's telephone number and the error of dialing by a simple system configuration. This prior invention only possesses the memory which memorizes the information only indicated on the business card.

Further, the system which consists of a small transmitter and a small receiver is conventionally known as a security system which provides thing-left-behind prevention, prevents luggage theft, etc.

For example, the above-mentioned system consists of a transmitter attached on a bag and a receiver which is carried by the owner of the bag.

A transmitter transmits the electric wave signal of the frequency band which is able to be received by a receiver for every definite period of time, and a receiver reports a warning sound in the state where it became impossible to receive the electric wave signal from the transmitter.

Carrying the function as such a transmitter in a portable telephone is also being realized with the spread of portable telephones these days.

For example, JP11-346389 discloses the portable telephone with a thing-left-behind prevention function which prevents a thing from being left behind because a main phone emits an alarm when communication with a portable telephone as a main phone and a cordless handset the device made to engage with personal belongings is impossible.

And, JP2000-287265 discloses the thing left behind/missing-child prevention device and handheld device which prevent a thing from being left behind and a missing child when an electric wave will stop arriving and a portable telephone will emit sound, if it consists of a cordless handset and a portable telephone as a main phone and a cordless handset separates from the portable telephone beyond a predetermined distance.

Further, JP2001-283351 discloses the thing-left-behind prevention device which consists of a main phone and a cordless handset to prevent a thing from being left behind. According to this prior invention, the main phone transmits an electric wave to a cordless handset at intermittently fixed time, and then shortly after the cordless handset receives this electric wave, the cordless handset will transmit an electric wave to a main phone. The main phone will repeat the cycle of checking the electric wave from a cordless handset, and a main phone reacts and informs by a warning buzzer when this cycle will be out of order.

However, according to the prior art mentioned above, there was a problem that both a main phone device and a cordless handset device must each have a power supply in order to communication each other.

For example, when the cordless handset had been turned off, it could not send a reply to the check signal from a main phone in spite of not having left anything behind. There was a problem that this could cause a the state of continually reporting that there was always a thing left behind.

Then, as mentioned above, it considers using the RFID technology which attracts attention these days.

According to this RFID technology, as compared with the former, updating and adding information are simple and easy, and package recognition for a plurality of solids is able to be carried out at the same time.

A power supply is unnecessary on this data carrier itself, and it is the mechanism of operating according to the power supply of the reader/writer which performs the reading and writing to a data carrier.

SUMMARY OF THE INVENTION

The first purpose of the present invention is to provide the communication system, communication method and program thereof for reading URL information memorized in the IC tag, accessing automatically to the contents corresponding to the URL information and acquiring the corresponding information by way of using the information-and-telecommunications terminal that carries the reader/writer function which the business card recipient owns.

The second purpose of the present invention is to provide the communication system, communication method and program thereof for informing certainly to a user that an article left behind or missing child exits by way of using the IC tag which does not need a power supply with a non-contact method and is easy to attach.

The present invention according to a first embodiment of the present invention provides a communication system comprising an IC tag attached on a business card; a first information-and-telecommunication terminal which carries reader function to the IC tag attached on the business card; and a server which is able to distribute contents corresponding to information memorized in the IC tag; wherein the first information-and-telecommunications terminal accesses the server by reading access information memorized in the IC tag by the reader function, and acquiring and displaying the contents corresponding to the access information concerned.

The present invention further provides the communication system comprising a second information-and-telecommunication terminal which carries reader/writer function, which is owned by a distributor of the business card; wherein the second information-and-telecommunication terminal accesses the server and performs creation/renewal of the contents.

The present invention according to the first embodiment still further provides the communication system wherein the second information-and-telecommunication terminal writes the access information of created and updated contents in the IC tag by the reader/writer function.

The present invention further provides the communication system wherein the second information-and-telecommunication terminal is characterized by arbitrarily changing in information disclosure level of the contents for every receipt person of the business card.

The present invention according to the first embodiment still further provides the communication system wherein the contents are personal information of the distributor of the business card.

The present invention according to a second embodiment provides a communication method applied to a communication system including an IC tag attached on a business card, a first information-and-telecommunication terminal which carries a reader function to the IC tag attached to the business card, a second information-and-telecommunication terminal which carries a reader/writer function, which is owned by a distributor of the business card and a server which is able to distribute contents corresponding to information memorized in the IC tag, wherein the first information-and-telecommunication terminal comprises a reading step for reading access information memorized in the IC tag by the reader function; an acquiring step for acquiring contents corresponding to the access information by way of accessing the server, and a displaying step for displaying the acquired contents corresponding to the access information; wherein the second information-and-telecommunication terminal characterized by comprising the steps of: creating and updating step for creating and updating the contents by way of accessing the server, writing step for writing access information of the created and updated contents in the IC tag by way of using the reader/writer function.

The present invention according to the second embodiment further provides the communication method wherein the second information-and-telecommunication terminal also has a setting step for setting change of information disclosure level of the contents arbitrarily for every receipt person of the business card.

The present invention further provides the communication method wherein the contents offer personal information of a distribution person of the business card.

The present invention provides a communication program applied to a communication system including an IC tag attached on a business card, a first information-and-telecommunication terminal which carries a reader function to the IC tag attached to the business card, a second information-and-telecommunication terminal which carries a reader/writer function, which is owned by a distributor of the business card and a server which is able to distribute contents corresponding to information memorized in the IC tag, wherein the first information-and-telecommunication terminal comprises a reading process for reading URL information as access information memorized in the IC tag by the reader function; an acquiring process for acquiring contents corresponding to the access information by way of accessing the server, and a displaying process for displaying the acquired contents corresponding to the access information; wherein the second information-and-telecommunication terminal includes a creating and updating process for creating and updating the contents by accessing the server, and a writing process for writing access information of the created and updated contents in the IC tag by using the reader/writer function.

The present invention further provides the communication program wherein the second information-and-telecommunication terminal further has a setting process for setting change of information disclosure level of the contents arbitrarily for every receipt person of the business card.

According to the second embodiment, the present invention still further provides the communication program wherein the contents offer personal information of a distribution person of the business card.

According to a third embodiment, the present invention provides a communication system comprising: an IC tag attached on an object, a reader/writer provided with a function which communicates with the IC tag for every predetermined time; a mobile information terminal which carries the reader/writer, wherein the mobile information terminal has a first alarm emission function for emitting a first alarm when communication with the reader/writer and the IC tag becomes impossible; a second alarm emission function for emitting a second alarm when communication with the reader/writer and the IC tag becomes possible; a position information acquisition function for acquiring a position information of the mobile information terminal when communication with the reader/writer and the IC tag becomes impossible; and a display function for displaying the position information which is acquired by the position information acquisition function.

The present invention further provides the communication system wherein the mobile information terminal suitably changes the timing for acquiring the position information by the position information acquisition function in accordance with electric wave environment, when communication of the reader/writer and the IC tag becomes impossible.

The present invention provides the communication system according to the third embodiment wherein the IC tag gives a unique identification number and setting change of correlation data with the object being arbitrarily possible via the reader/writer from the mobile information terminal.

The present invention still further provides the communication system wherein the first alarm and the second alarm are different or have the same sound, luminescence, vibration or screen information, or its combination, and setting change is arbitrarily possible from the mobile information terminal.

The present invention also provides the communication system wherein the position information acquisition function acquires the position information based on received electric wave intensity with two or more base stations.

The present invention further provides the communication system wherein the position information acquisition function acquires the position information by communication with a GPS Satellite via base stations.

The present invention still further provides the communication system wherein the mobile information terminal is connected with a management server via a communication line and provides the function which transmits the first alarm and the position information acquired by the position information acquisition function to the management server.

The present invention further provides the communication system herein the management server provides an information program about the communications system using the IC tag and offers information about a lost article in the information program for a terminal device which is able to be accessed via the communication line.

The present invention according to a fourth embodiment provides a communication program applied to a communication system including an IC tag attached on an object, a reader/writer provided with a function which communicates with the IC tag for every predetermined time, and a mobile information terminal which carries the reader/writer, wherein the mobile information terminal has a first alarm emission process for emitting a first alarm when communication with the reader/writer and the IC tag becomes impossible; a second alarm emission process for emitting a second alarm when communication with the reader/writer and the IC tag becomes possible; a position information acquisition process for acquiring a position information of the mobile information terminal when communication with the reader/writer and the IC tag becomes impossible; and a display process for displaying the position information which is acquired by the position information acquisition process.

The present invention according to the fourth embodiment provides the communication program wherein the mobile information terminal is connected with a management server via a communication line and provides a process which transmits the first alarm and the position information acquired by the position information acquisition process to the management server.

The present invention still further provides the communication program wherein the mobile information terminal provides a process which restricts functions of the mobile information terminal when the mobile information terminal is in a missing condition.

The present invention further provides the communication program wherein the position information acquisition process changes the acquisition timing of the position information according to electric wave environment.

The present invention according to a fifth embodiment provides a communication system comprising: an IC tag attached on an object; a reader/writer provided with a function which communicates with the IC tag for every predetermined time; and a mobile information terminal which carries the reader/writer, wherein the mobile information terminal emits a first alarm when communication with the reader/writer and the IC tag becomes impossible, emits a second alarm when communication with the reader/writer and the IC tag becomes possible; wherein the first alarm and the second alarm are different or have the same sound, luminescence, vibration or screen information, or its combination, and setting change is arbitrarily possible from the mobile information terminal.

The present invention further provides the communication system wherein the mobile information terminal detects and temporarily memorizes the position information of the mobile information terminal when communication with the reader/writer and the IC tag is possible, and displays the position information which is temporarily memorized when communication with the reader/writer and the IC tag becomes impossible.

The present invention according to a sixth embodiment provides a communication system comprising: an IC tag attached on an object; a reader/writer provided with a function which communicates with the IC tag for every predetermined time; and a mobile information terminal which carries the reader/writer, wherein the mobile information terminal detects and temporarily memorizes the position information of the mobile information terminal when communication with the reader/writer and the IC tag is possible, emits an alarm when communication with the reader/writer and the IC tag becomes impossible, and displays the position information which is memorized temporarily.

The present invention further provides the communication system wherein the IC tag having given an unique identification number and setting change of correlation data with the object being arbitrarily possible via the reader/writer from the mobile information terminal.

The present invention further provides the communication system wherein the mobile information terminal emits a first alarm when communication with the reader/writer and the IC tag becomes impossible, and emits a second alarm when communication with the reader/writer and the IC tag becomes possible.

The present invention still further provides the communication system wherein the first alarm and the second alarm are different or have the same sound, luminescence, vibration or screen information, or its combination, and the setting change being arbitrarily possible from the mobile information terminal.

The present invention further provides the communication system wherein the mobile information terminal detects and temporarily memorizes the position information of the mobile information terminal using two or more base stations when communication with the reader/writer and the IC tag is possible, and displays the position information which is memorized temporarily when communication with the reader/writer and the IC tag becomes impossible.

The present invention still further provides the communication system wherein the mobile information terminal has a GPS function, detects and temporarily memorizes the position information of the mobile information terminal by communication with a GPS satellite via base stations, and displays the position information which is memorized temporarily when communication with the reader/writer and the IC tag becomes impossible.

The present invention further provides the communication system wherein the mobile information terminal acquires the position information of the mobile information terminal by communication with the GPS Satellite and the base stations whenever communication with the reader/writer and the IC tag is performed, and overwrites and updates the acquired position information on the position information that is memorized temporarily.

The present invention according to a sixth embodiment provides a communication program applied to a communication system including an IC tag attached on an object, a reader/writer provided with a function which communicates with the IC tag for every predetermined time, and a mobile information terminal which carries the reader/writer, wherein the mobile information terminal has a communication control process which controls communication with the reader/writer and the IC tag; and a position information detection/memory process which detects the position information of the mobile information terminal and memorizes the detected position information temporarily when communication with the reader/writer and the IC tag is possible.

The present invention further provides the communication system wherein the business card is attached with the IC tag or is attached with a bar code which includes URL information instead of attaching with the IC tag, and wherein the first information-and-telecommunication terminal consists of a reader function for reading the bar code attached on the business card, accesses to the contents management server by reading the access information included in the bar code using the reader function, and displays contents corresponding to the access information which is acquired from the contents management server.

According to the present invention, the business card receipt person is able to acquire the Web page information corresponding to the URL information memorized beforehand in the IC tag and can check the contents easily by reading the information memorized in the IC tag, by way of using the information-and-telecommunications terminal which the business card receipt person owns.

According to the present invention, the business card receipt person who received the business card to which is attached the IC tag written in the URL information of the business card distribution person's homepage was given is able to access the contents management server using the information-and-telecommunications terminal which the business card receipt person owns. The business card receipt person is able to check the information on the business card distribution person's homepage easily and the business card distribution person is able to update the contents of the homepage easily from the information-and-telecommunications terminal which the business card distribution person owns.

According to the present invention, since a setting change of the permitted level of personal information is able to be arbitrarily made for every visitor by a business card distribution person, an invasion of privacy is able to be prevented beforehand by setting up low the permitted level to the person by whom neither the first meeting nor a confidential relation is constructed.

According to the present invention, a security system is able to be easily constructed only by sticking or equipping personal belongings with the IC tag of a non-contact method, and equipping the portable telephone which a user owns with the reader/writer which communicates with the IC tag concerned.

According to the present invention, since it is not necessary to carry a power supply in order for an IC tag to transform into electric power the radio electric wave transmitted from the reader/writer and to transmit a reply signal, the fault that a system is not able to be used according to a dead battery is fully cancelable.

According to the present invention, since sound, luminescence, vibration, text information, picture information, etc. report to a user the alarm which reports that a thing left behind exists, and the alarm which shows that a thing left behind exists in the neighborhood, the existence of a thing left behind is able to be certainly reported.

According to the present invention, the position information on the object on which the IC tag attached is displayed on a portable telephone when a reader/writer and an IC tag are impossible to communicate, then the user is able to grasp easily the position information in which a thing left behind exists.

BRIEF EXPLANATION OF THE DRAWINGS

FIG. 5 is a figure showing an example of information used for information registration of a homepage.

FIG. 6 is a figure showing an example of the information registration screen of a homepage.

FIG. 8 is a figure showing the example at the time of setting up information disclosure level in three steps.

FIG. 9 is a figure showing the example of a screen of access refusal/permitted level set-up.

FIG. 16 is a plan showing the first example of the display screen of a portable telephone.

DETAILED DESCRIPTION OF THE PRESENT INVENTION

Hereafter, the embodiment of the communication system, communication method and program thereof concerning the present invention is explained in detail, referring to the accompanying drawings.

The embodiment of the communication system, communication method and program thereof concerning the present invention is shown in FIG. 1 to FIG. 18.

Figure 1:
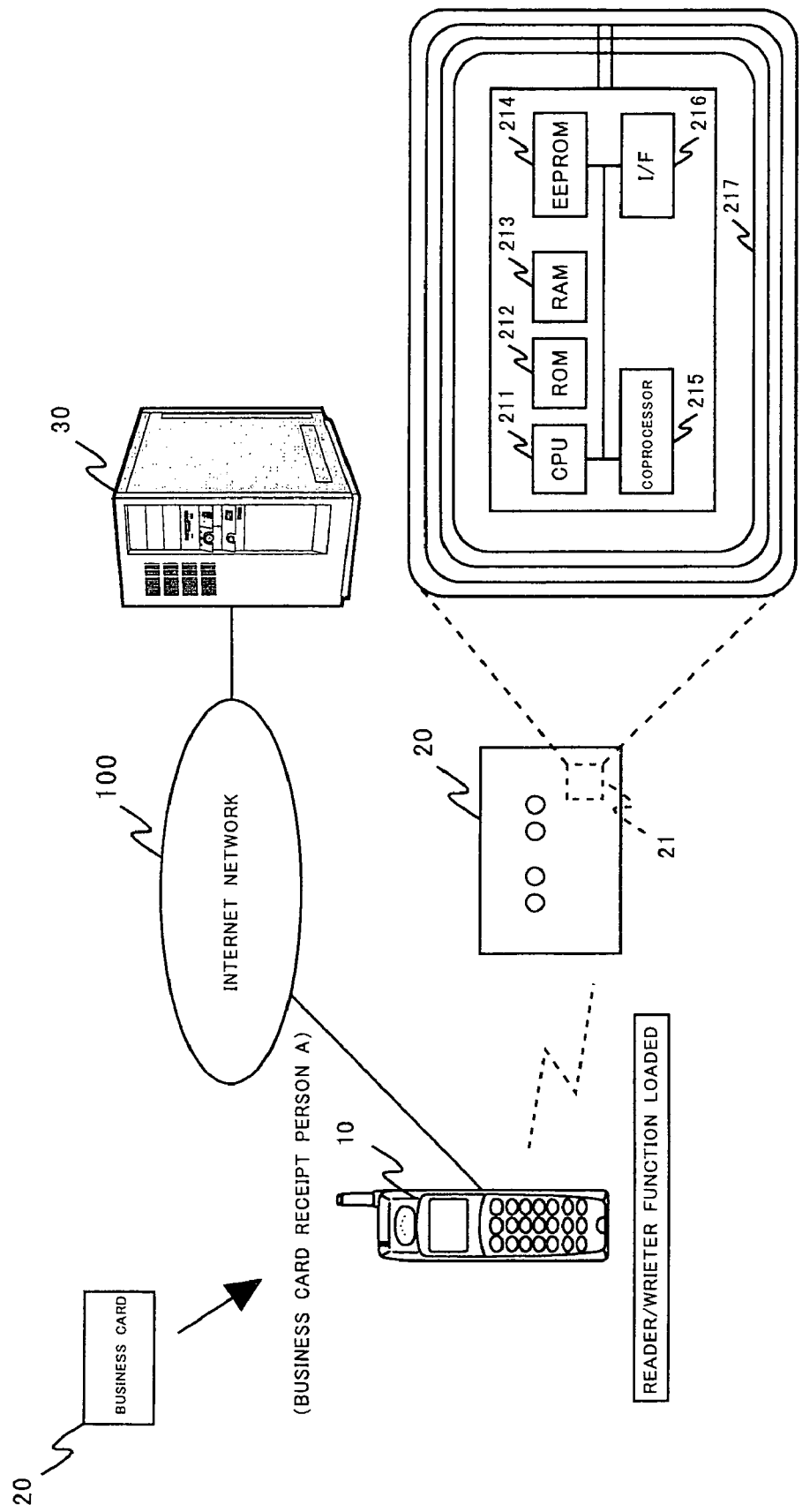
FIG. 1 is a system configuration figure showing the first embodiment of the present invention.

FIG. 1 is a system configuration figure showing the outline of the communication system using the IC tag which is the first embodiment of the present invention.

As shown in the FIG. 1, the communication system using the IC tag which is the first embodiment of the present invention comprises an information-and-telecommunications terminal 10, a business card 20 with which the IC tag of the non-contact method is attached, and a contents management server 30.

The information-and-telecommunications terminal 10 and the contents management server 30 is able to communicate via the internet network 100.

The information-and-telecommunications terminal 10 is a portable telephone (PHS and PDA are included) provided with the usual transceiver function, and also provided with the indication unit and the control unit.

The information-and-telecommunications terminal 10 is a terminal which is owned by the user who is a business card receiver and is under the environment which is able to access the contents management server 30 via the Internet network 100.

Further, the information-and-telecommunications terminal 10 carries the reader function to read the information memorized in the IC tag 21 attached on the business card 20.

In addition, the information-and-telecommunications terminal 10 may not have only the reader function but also the writer function. It may be those functions built in the information-and-telecommunications terminal 10 as well as it is built out as an external device.

The business card 20 is the usual business card used on a business scene and a corporate name, his affiliation post name, an executive name, a name, an address, a telephone number, a facsimile number, an e-mail address, etc. were printed on business card 20.

The IC tag (it is also called IC seal) 21 is attached on a part of the business card 20.

The IC tag 21 operates by receiving the radio electric wave of a specific frequency band.

The IC tag 21 is provided with the function as a recording medium, and a serial identification number (hereafter called serial number) which does not overlap and is recorded in the IC tag 21 in a manufacturing stage beforehand, or recoded in the IC tag 21 in afterwards.

The IC tag 21 is formed as an IC chip which consists of CPU211, ROM212, RAM213, EEPROM214, coprocessor215, I/F(interface) 216 and antenna (loop antenna) 217 allocated so that the periphery of the IC chip may be surrounded.

The shape in particular of the IC tag 21 is not limited, and should just be provided with composition which was mentioned above.

The contents management server 30 is a computer server which manages the contents for distributing through the network and communicates to the information-and-telecommunications terminal 10 via the internet network 100.

The contents management server 30 manages many kinds of contents data, and it possesses the database for managing information including the access history to each contents and the access frequency information, etc.

The contents management server 30 possesses a list of visitors data which is generated automatically based on the access history or access frequency.

Figure 2:
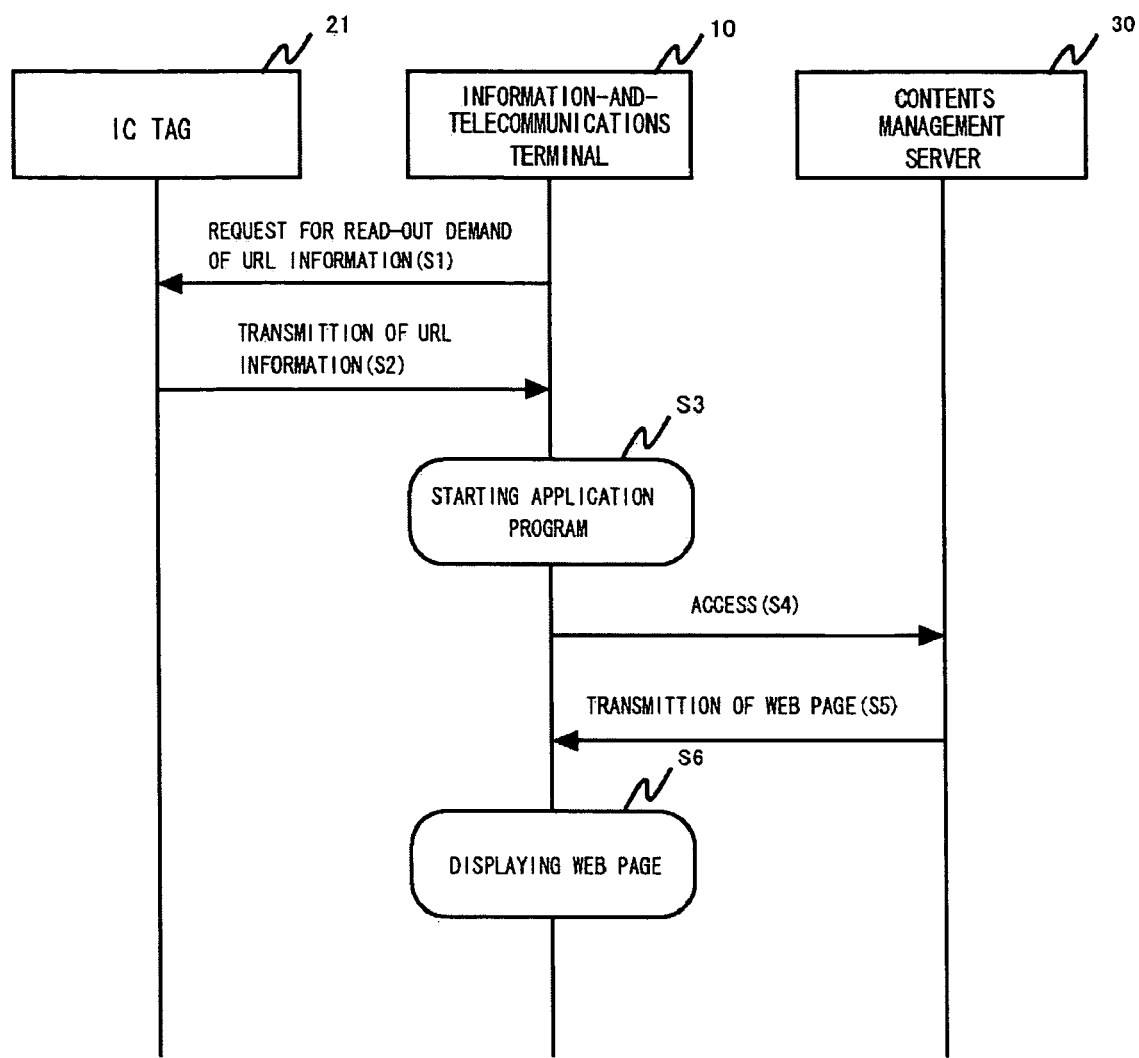
FIG. 2 is a sequence chart which shows the example of operation by the first embodiment of the present invention.

FIG. 2 is a sequence chart which shows the example of the communication system using the IC tag which is the first embodiment of the present invention of operation.

First, business card receipt person A, who received the business card 20, holds up the information-and-telecommunications terminal 10 on the IC tag 21 attached on the business card 20 concerned. Then, the information-and-telecommunications terminal 10 (IC tag reading mode working) transmits a read-out demand of URL information to the IC tag 21 by a reader function (Step S1).

The IC tag 21 transits the URL information memorized in the IC tag 21 to the information-and-telecommunications terminal 10 (Step S2).

The information-and-telecommunications terminal 10 starts an application program automatically (Step S3), and it accesses to the contents management server 30 via the internet network 100 based on the URL information acquired from the IC tag 21 (Step S4).

The information-and-telecommunications terminal 10 may carry the application program beforehand, or it may be made to download it from the contents management server 30 at the time of system use.

The contents management server 30 transmits the contents (Web page) corresponding to the transmitted URL information to access from the information-and-telecommunications terminal 10 (Step S5).

The information-and-telecommunications terminal 10 displays the Web page transmitted from the contents management server 30 (Step S6).

According to the first embodiment of the present invention, only by reading the information on the IC tag attached on the received business card with the information-and-telecommunications terminal 10 which the business card receipt person A owns, the contents (Web page) corresponding to the URL information beforehand memorized in the IC tag 21 is able to be acquired, and the contents are able to be checked easily by the business card receipt person A.

Figure 3:
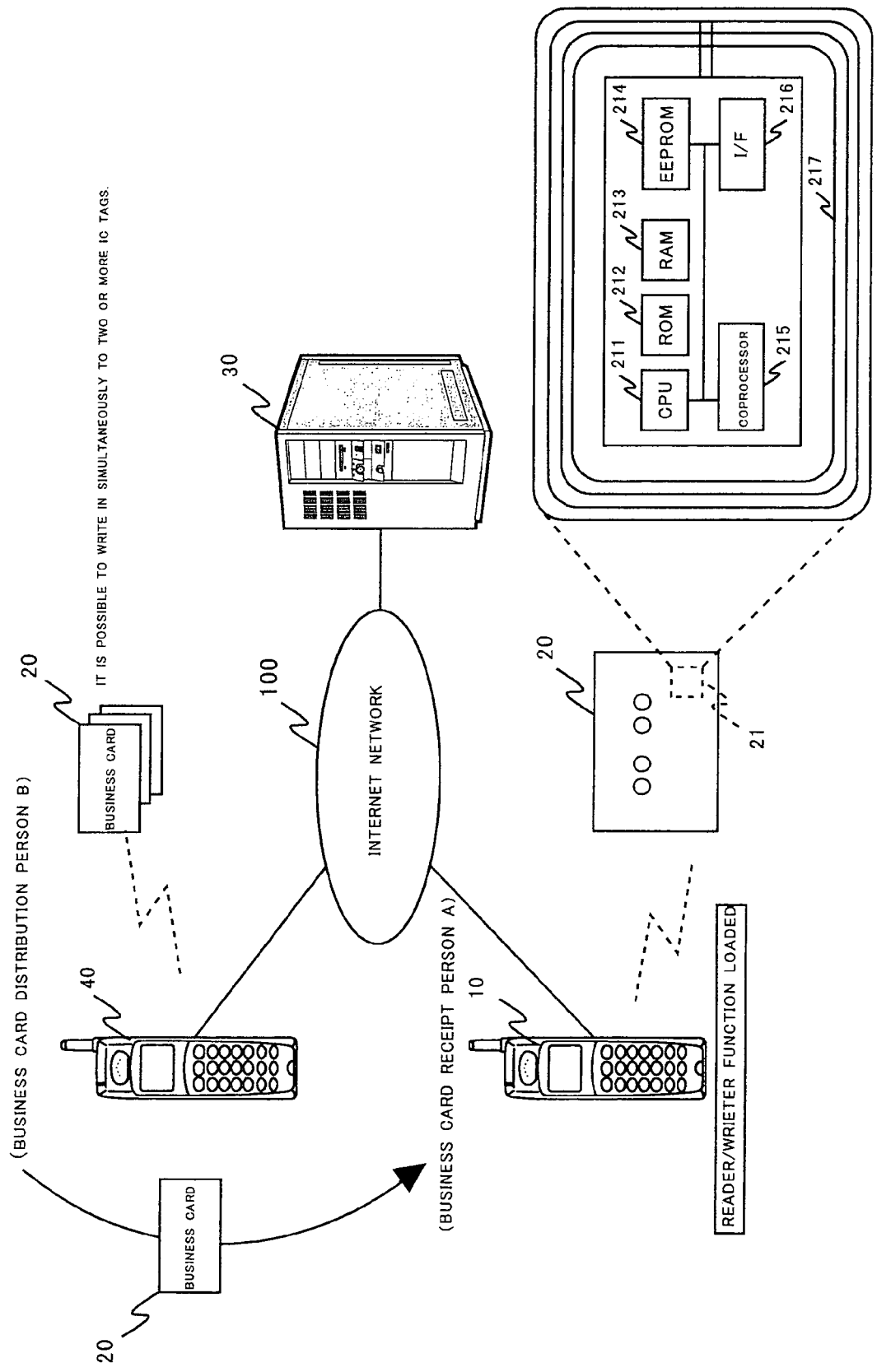
FIG. 3 is a system configuration figure showing the second embodiment of the present invention.

FIG. 3 is a system configuration figure showing the outline of the communication system using the IC tag, which is the second embodiment of the present invention.

As shown in FIG. 3, the communication system using the IC tag which is the second embodiment of the present invention, includes an information-and-telecommunications terminal 10 which the business card receipt person A owns, a business card 20 with which the IC tag of the non-contact method is attached, a contents management server 30, and an information-and-telecommunications terminal 40 which the business card distribution person B owns.

The information-and-telecommunications terminal 10, the contents management server 30 and the information-and-telecommunications terminal 40 are able to communicate via the internet network 100.

In the second embodiment of the present invention, the business card distribution person B starts a personal homepage (Web page), and he is able to update the contents of his personal homepage at any time.

About the same component described in the first embodiment mentioned above, the same numerals are attached and the explanation is omitted.

The information-and-telecommunications terminal 40 is a portable telephone (PHS and PDA are included) provided with the usual transceiver function, and is also provided with the indication unit and the control unit.

The information-and-telecommunications terminal 40 is a terminal which owned by the user who is a business card distributor and is under the environment which is able to access the contents management server 30 via the Internet network 100.

Further, the information-and-telecommunications terminal 40 carries the reader function to read the information memorized in the IC tag 21 attached on the business card 20 and also carries the writer function to write the information to the IC tag 21.

In addition, the reader function and the writer function may be built in the information-and-telecommunications terminal 40 as well as it is built as an external device, and the writer function is able to write information two or more IC tags at the same time.

Figure 4:
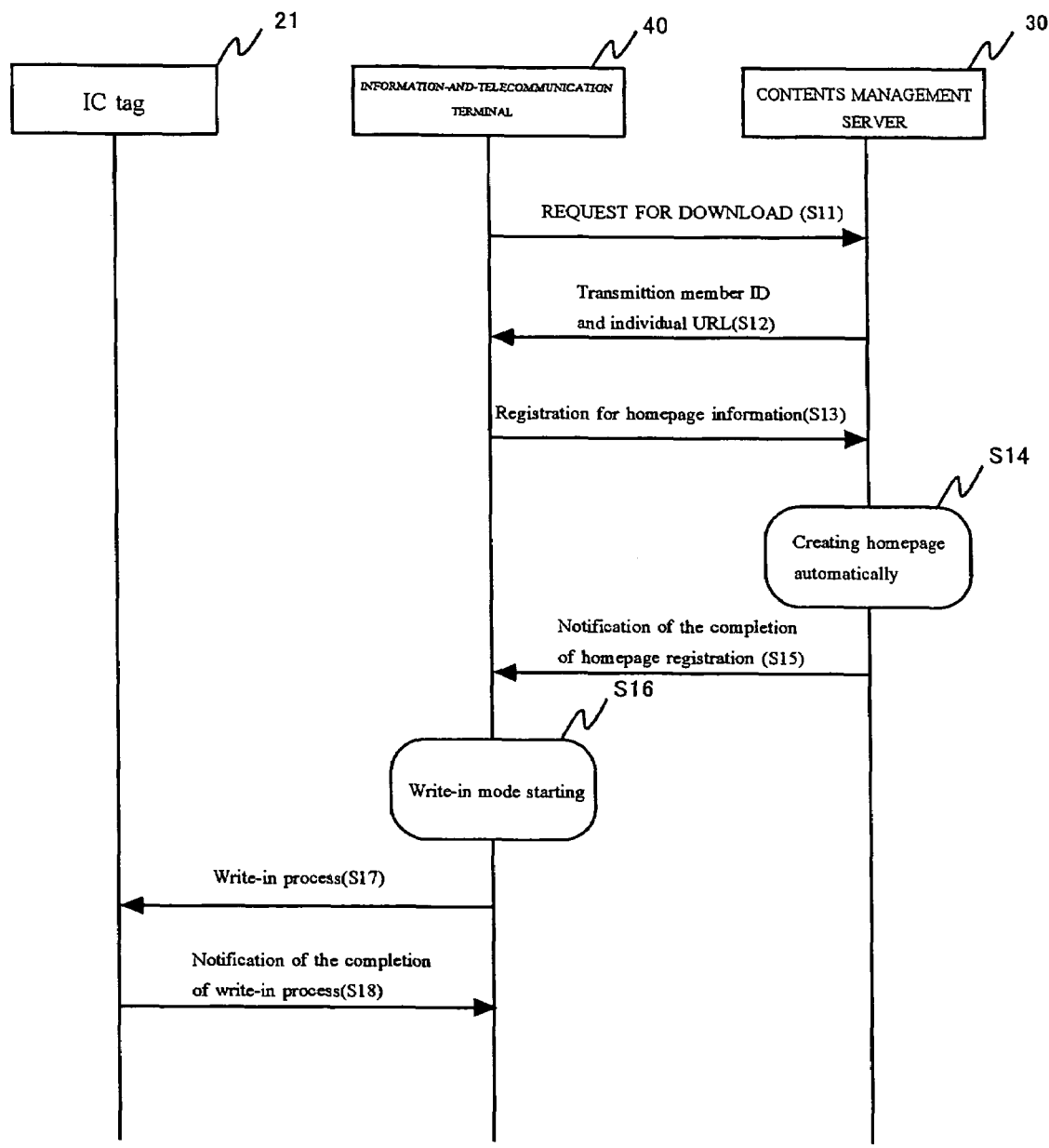
FIG. 4 is a sequence chart which shows the example of operation by the second embodiment of the present invention.

FIG. 4 is a sequence chart which shows the example of the writing of the URL information from homepage creation of personal information to an IC tag of operation in the second embodiment of the present invention.

First, the information-and-telecommunications terminal 40 which business card distribution person B owns is accessed via the internet network 100 to the contents management server 30, and the download request of the application program for exclusive use about system use is transmitted to the contents management server 30 (Step S11).

The contents management server 30 transmits member ID and individual URL to the information-and-telecommunications terminal 40, after performing a predetermined system use registration procedure to the download request from the information-and-telecommunications terminal 40 (Step S12).

When the member ID and the individual URL are transmitted to the information-and-telecommunications terminal 40 from the contents management server 30, in order that it may start a business card distribution person B individual's homepage (Web page), information registration processing of a homepage is performed (Step S13).

FIG. 5 is a figure showing an example of information used for information registration of a homepage.

As a homepage started individually, although there is a personal private page and a business page for companies, one person is able not to necessarily restrict to one and to register two or more homepages.

According to the information from FIG. 5, although "☐" is defined as an indispensable input item and "■" is considered as arbitrary input items, each of these items is able to be specified alternatively.

It is only performing easy input process using the control unit of the information-and-telecommunications terminal 40 since input form with the constant information is beforehand offered by the contents management server 30, as it shows business card distribution person B who becomes the information registration side in FIG. 6.

In Step S13, the contents management server 30, which is transmitting homepage information, starts the program for creating a homepage automatically and creates a homepage of the business card distribution person B automatically (Step S14), then notifies a notice of the completion process of registration about the created homepage to information-and-telecommunications terminal 40 (Step S15).

The information of the homepage, which registration process completed, is stored in the memory of the information-and-telecommunications terminal 40 and is able to be checked at any time.

When the information-and-telecommunications terminal 40 receives the notice of the completion of registration process of a homepage from the contents management server 30, the write-in mode to the IC tag is started by the business card distribution person B (Step S16), and the information-and-telecommunications terminal 40 performs to write the member ID and the URL information on a homepage in the IC tag 21, that arranged in the neighborhood, by the reader/writer function (Step S17).

The IC tag 21 transmits the notice of write-in completion, when the write-in processing by the information-and-telecommunications terminal 40 is completed (Step S18).

The information-and-telecommunications terminal 40 is able to verify that member ID and URL information were certainly written in the IC tag 21 by checking the notice of write-in completion transmitted from the IC tag 21.

Figure 7:
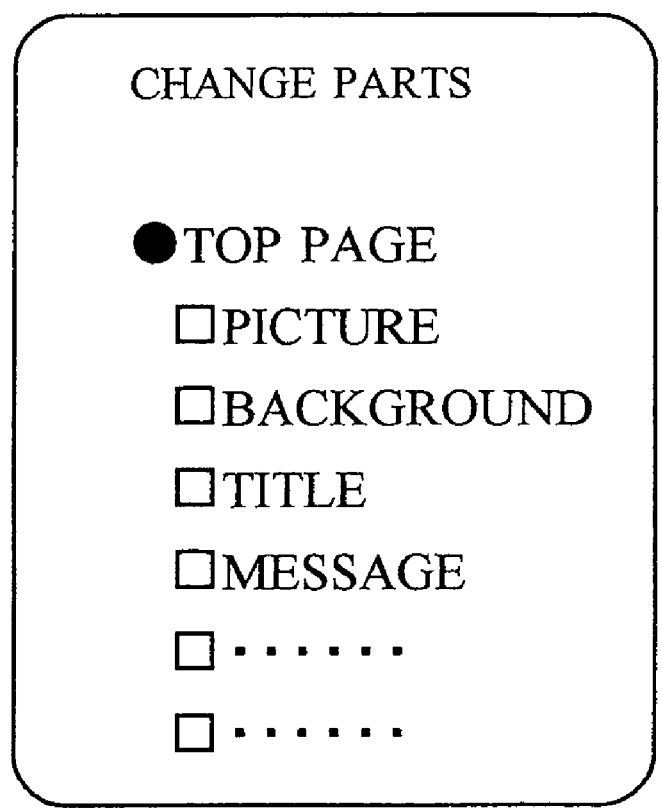
FIG. 7 is a figure showing an example of the selection picture of the correction term at the time of renewal of a homepage.

At the time of renewal of a homepage, the contents management server 30 is accessed from the information-and-telecommunications terminal 40, and transmits a name, member ID, URL information, etc. and a correction term is inputted into predetermined correction form by the user and transmitted them after choosing a correction term from a selection screen as shown in FIG. 7.

In the contents management server 30, it is able to be updated easily since the updating data is automatically carried out by the corrected contents to the newest data.

According to the second embodiment of the present invention, the business card receipt person A, who received the business card attached with the IC tag which memorized the URL information of the homepage started by the business card distribution person B and his member ID, is able to check the business card distribution person B's homepage easily by accessing the contents management server 30 using the information-and-telecommunications terminal 10 as mentioned in the example of the first embodiment above.

The service mentioned-above is able to be used if the business card distribution person B pays a monthly amount utilization charge to the administrator of the contents management server 30.

The third embodiment of the present invention makes a setting change of the information disclosure level in business card distribution person's B personal information homepage (private data) arbitrarily based on the visitor list currently kept in the database of contents management server 30.

FIG. 8 is a figure showing the example at the time of setting up information disclosure level in three steps.

As shown in FIG. 8, there is a danger of easily infringing on privacy since it may be used in the private data also as a place which releases personal information, such as a personal secret.

According to the third embodiment of the present invention, personal relationships are classified into the following three levels and a business card distribution person is able to make a setting change of the information disclosure level arbitrarily from the information-and-telecommunications terminal.

Information disclosure level 1 (☐) First meeting level
Information disclosure level 2 (○) Friend level
Information disclosure level 3 (☐) Boyfriend, Girlfriend, friends, family level Further, the information disclosure level set-up once is able to be changed suitably and easily, and it is able to be set-up for every visitor depending on how close to its relation.

In the case of releasing no personal information, or when it is judged that the writing to a bulletin board is unsuitable, it is also possible to access the contents management server from the information-and-telecommunications terminal in order to refuse the access from a specific visitor or to delete a record of a visitor who is a write-in person to a bulletin board.

In the case of business data, it is not necessary to set-up the information disclosure level because the business data is usually opened to the public, but it is possible to set-up arbitrarily.

If the person who writes to a bulletin board page unsuitably, he is able to be deleted by the above-mentioned method.

FIG. 9 is a figure showing the example of a screen of access refusal/permitted level set-up.

The visitor table currently kept by the database is shown in FIG. 9(a), and it is possible to change set-up, such as "deletion (access refusal)" and "level change" on this screen.

The deletion report screen as shown in FIG. 9(b) or the level change notice screen as shown in FIG. 9(c) is displayed at the time of access from a visitor who is deleted or level changed by the set-up.

According to the third embodiment of the present invention, since a setting change of the permitted level of personal information is able to be arbitrarily made for every visitor, therefore, it prevents from the invasion of privacy beforehand by setting up the permitted level low to the person by whom neither the first meeting person nor an unconfident related person.

Each embodiment mentioned above is a suitable embodiment of the present invention, and it is possible to change within limits which do not deviate from the main point of the present invention variously, and to carry out.

For example, the method of printing URL information on a business card may be used with an IC tag or without using an IC tag, indicating or memorizing as bar code information (one dimension/two dimensions).

For another example, after the information-and-telecommunications terminal which prepares a bar code reader function for the case where it is printed as bar code information performs reading operation, it is also possible to be made to perform access processing based on the read URL information.

It is possible to provide suitably additional services, such as members' affinity fortune-telling service etc. which is uniquely managed by the contents management server side to the member who performed use registration of this system.

It is also possible to provide suitably additional services, such as address book creation service based on the data of the visitor list managed in the database and simultaneous notice service to the mail address further specified arbitrarily from the visitor list.

Further, it is possible to use the present invention for a private scene or a business scene and not only the business card but it is possible to attach the IC tag, which memorized the URL information on the homepage which opened beforehand, on the pamphlets for an advertisement and distribute them.

Figure 10:
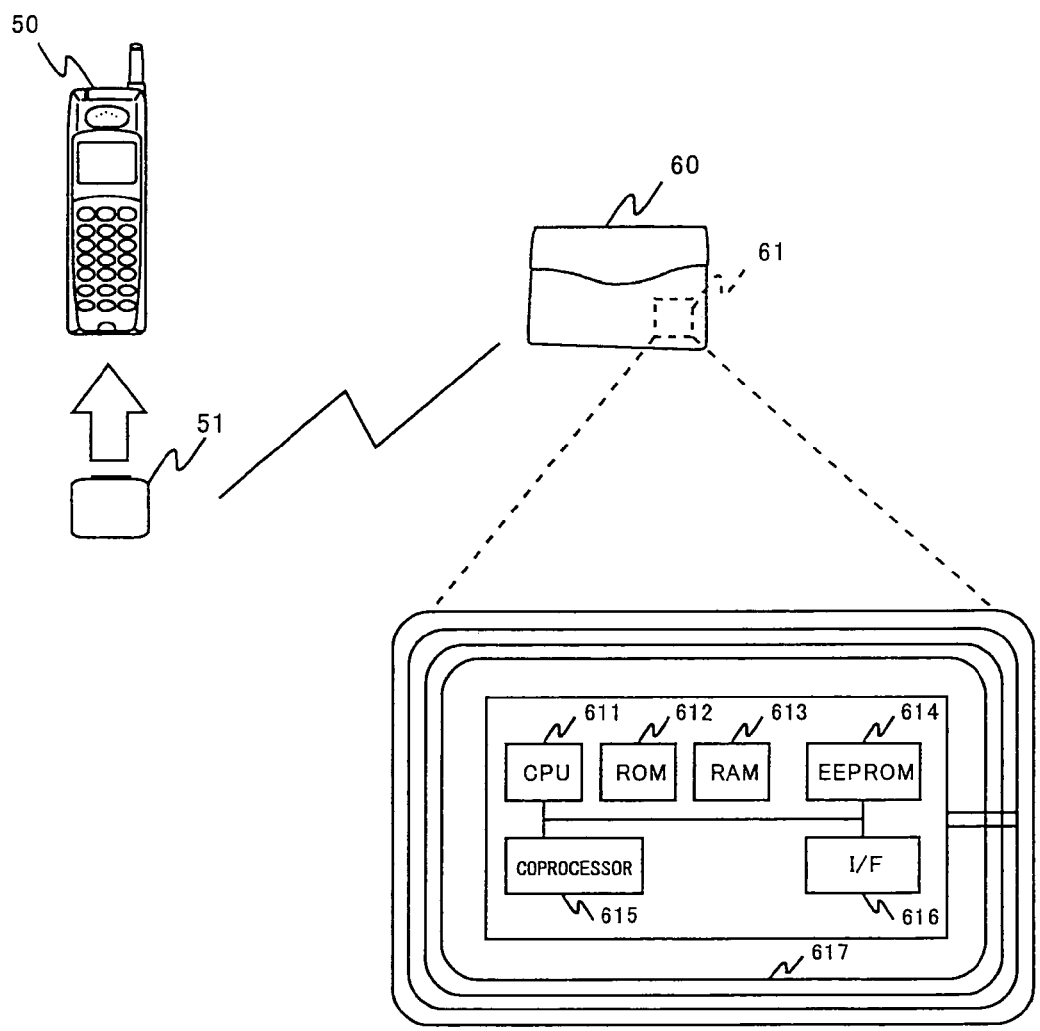
FIG. 10 is a system configuration figure showing the fourth embodiment of the present invention.

FIG. 10 is a figure showing the outline composition of the communication system using the IC tag which is the fourth embodiment of the present invention.

In FIG. 10, the communication system using the IC tag which is the fourth embodiment of the present invention is consisted of portable telephone 50, reader/writer 51 carried in the portable telephone 50 and IC tag (IC seal) 61 with which attached on personal belongings 60 such as a bag, a notebook, a key case and a wallet, etc.

The portable telephone 50 is a usual portable telephone (PHS is also included) provided with the usual transceiver function, and also provided with the indication unit and the control unit.

The portable telephone 50 downloads the application program for using the system concerned on the website connected via an Internet network and performs various motion controls.

The reader/writer 51 is attached to the portable telephone 50 as an external device and operated with the electric power supplied from the portable telephone, and is provided with the function which communicates with the IC tag 61 for every predetermined time by radio.

The reader/writer 51 may be built as an external device as well as built in the portable telephone 50.

A distance from which of this reader/writer 51, and IC tag 61 are able to communicate with each other is about 5 m.

The IC tag (IC seal) 61 which is attached on personal belongings 60 operates by receiving the radio electric wave of a specific frequency band.

The IC tag 61 is formed as an IC chip which consists of CPU 611, ROM 612, RAM 613, EEPROM 614, coprocessor 615, I/F(interface) 616 and antenna (loop antenna) 617 allocated so that the periphery of the IC chip may be surrounded.

The IC tag 61 is given the identification number (hereafter called serial number) in which a peculiar alteration is impossible in a manufacturing stage beforehand, or manufactured as a blank in a manufacturing stage and the identification number is set-up arbitrarily later Further, the proper data of personal belongings is written in the IC tag 61 by the user via the reader/writer 51 from the control unit of the portable telephone 50.

The data written in the IC tag 61 is not restricted, therefore, it is also possible to write in the IC tag with the user information including a user's address, a name, and a contact address, and so on.

In addition, the number of IC tag 61 is not limited to one and may comprise two or more IC tags.

Although explained as the IC tag provided with a card shape, it combines with a label type, a coin type, a stick type, etc. depend on the usage of the IC tag and the shape of the IC is not limited to a particular shape.

Figure 11:
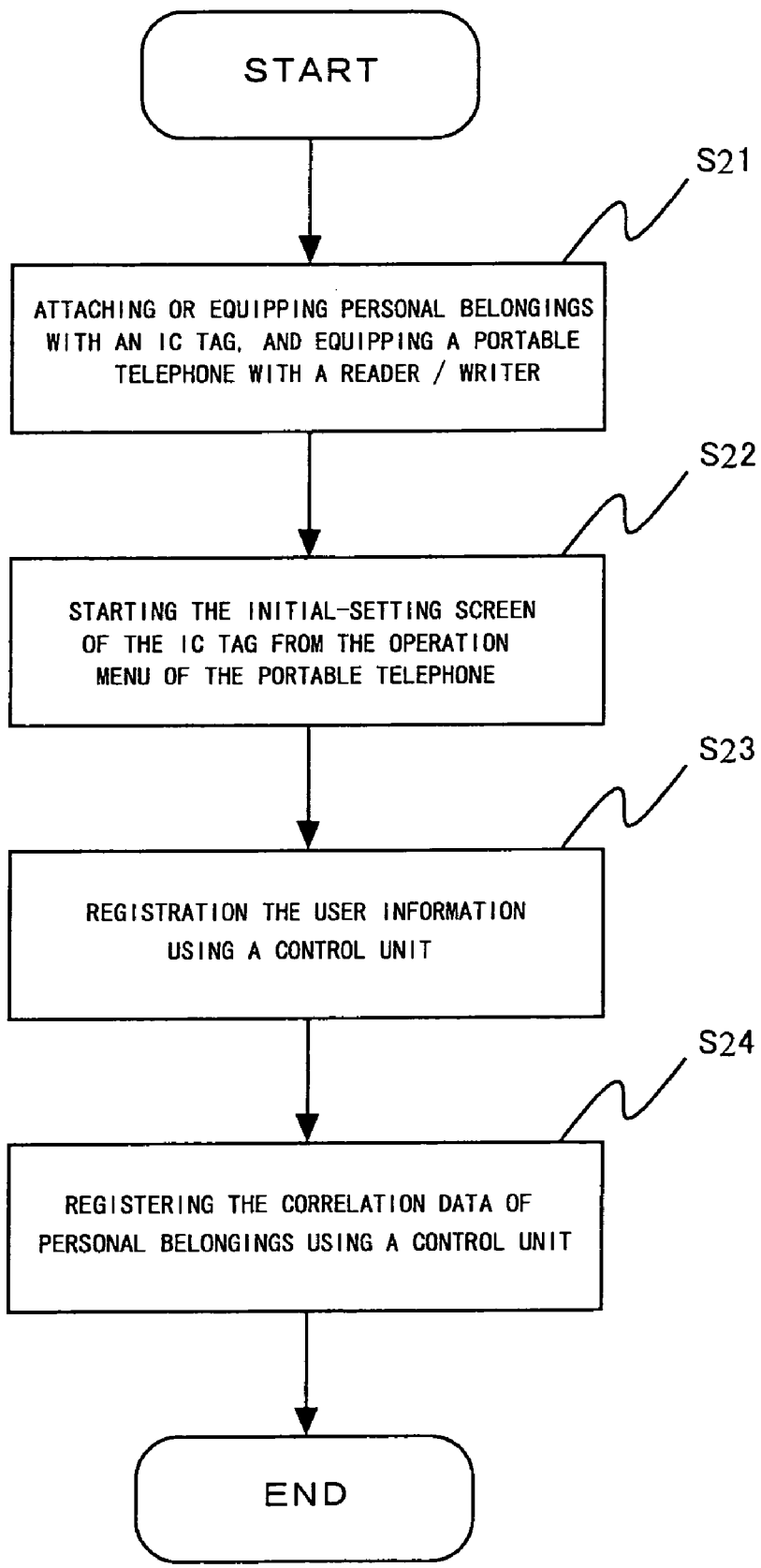
FIG. 11 is a flow chart which shows the example of operation at the time of initial setting of the IC tag in the fourth embodiment of the present invention.

FIG. 11 is a flow chart which shows an initial-setting operation at the time of using the communication system using the IC tag which is the fourth embodiment of the present invention.

First, the user (hereafter called a user) of this system attaches or equips the personal belongings 60 (for example, bag etc.) with IC tag 61, and equips the portable telephone 50 which the user owns with the reader/writer 51 (Step S21).

Next, the user starts the initial-setting screen of the IC tag from the operation menu of the portable telephone 50 (Step S22).

The user registers the correlation data (for example, data in which it is shown that personal belongings are bags) of personal belongings 60 using a control unit (Step S24) after registering user information (a name, an address, a contact, etc.) (Step S23), and ends initial-setting processing.

The data by which initial setting was carried out here is written in EEPROM 614 of the IC tag 61 by wireless communications via a reader/writer 51.

Under the present circumstances, when there are IC tags which is not a target for writing-in process, those IC tags have to be arranged in the outside area of the range of writing-in electric wave.

For example, when equipping with and using the IC tag for each of a "bag", a "wallet", and a "pass holder", the correlation data written in the IC tag 61a-61c turns into the following data.

Further, the indication "<No._____>" shown below is an identification number peculiar to each IC tag which is not able to be altered.

(1) IC tag 61 a<No.000000002043003>=bag
(2) IC tag 61 b<No.000000002043004>=wallet
(3) IC tag 61 c<No.000000002043005>=pass holder The EEPROM 614 is an electrically rewritable recording medium so that it is also able to set-up the correlation data of new personal belongings again after predetermined elimination processing via portable telephone 50, even if the data was set-up by initial-setting process.

The timing which performs correlation with personal belongings is arbitrary. For example, it is possible to register from an outstation, and to delete or change of the correlation data which were registered.

Figure 12:
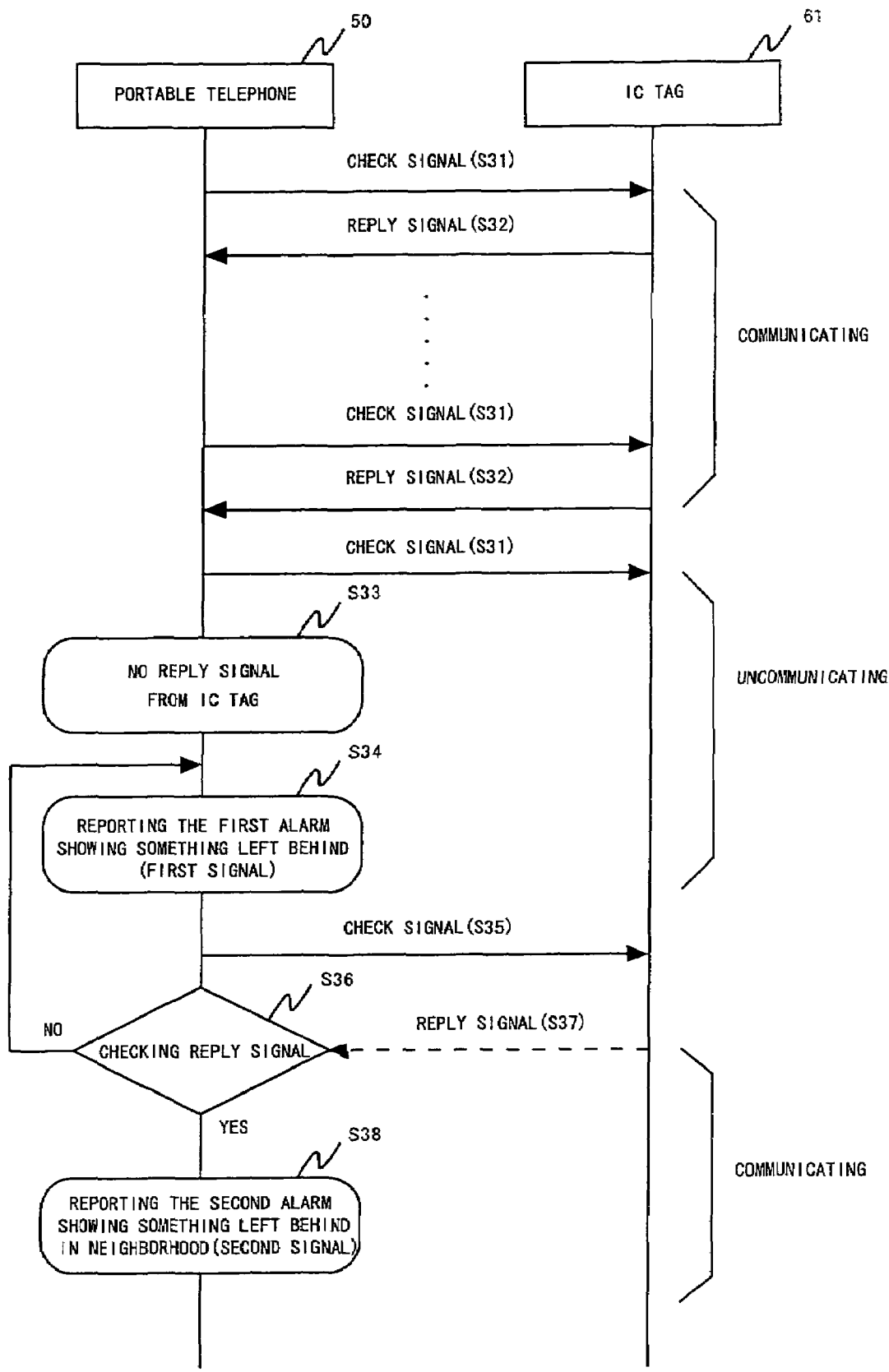
FIG. 12 is a sequence chart which shows operation by the fourth embodiment of the present invention.

FIG. 12 is a sequence chart which shows the example of the communication system using the IC tag which is the fourth embodiment of the present invention of operation.

First, portable telephone 50 equipped with the reader/writer 51 transmits a check signal to thee IC tag 61 attached on the personal belongings 60 via the reader/writer 51 (Step S31).

The portable telephone 50 counts an interval until a timer function receives the reply signal from the IC tag 61 after transmitting the check signal to the IC tag 61 via a reader/writer 51.

Then, the IC tag 61 transmits a reply signal, when the check signal transmitted via the reader/writer 51 is received (Step S32).

When the reply signal from the IC tag 61 is received, the portable telephone 50 stops the count by a timer function and counts predetermined time until the next check signal transmits to the IC tag 61 by a timer function.

Setting change is arbitrarily possible by a user for the communication interval of the portable telephone 50 and the IC tag 61 which equipped with the reader/writer 51.

The portable telephone 50 repeats the process of Step S31 while the reply signal from the IC tag 61 is answered, which means that the IC tag 61 and the portable telephone 50 are in condition to communicate each other.

The IC tag 61 transits a reply signal whenever IC tag 61 receives the check signal transmitted via a reader/writer 51 (Step S32).

After the portable telephone 50 transmits a check signal to the reader/writer 51, when an interval until a timer function receives a reply signal exceeds a predetermined value (communication impossible state), the portable telephone 50 judges that there is no reply signal from the IC tag 61 (Step S33), and reports the first alarm (The user forgets the personal belongings 60) to the user (Step S34).

When the first alarm is reported via the portable telephone 50, the user can go out to the place considered to have forgotten personal belongings 60 with portable telephone 50 in the state where it is equipped with the reader/writer 51 possessed, and look for the personal belongings 60 concerned.

The user does not necessarily need to look for the personal belongings 60 immediately after reporting the first alarm.

After the portable telephone 50 reports the first alarm to the user, it transmits a check signal to the IC tag 61 for every predetermined time via the reader/writer 51 (Step S35), and checks the reply signal from the IC tag 61 (Step S36).

In Step S36, if the case where there is no reply signal from the IC tag 61 (no reply), the portable telephone reports the first alarm again (Step S34).

If the user who carries the portable telephone 50 equipped with the reader/writer 51 moves to the neighborhood (state which is able to be communicated) of the personal belongings 60 left behind, the IC tag 61 transmits the reply signal over the check signal transmitted via the reader/writer 51 (Step S37).

In Step S36, the portable telephone 50 reports the second different alarm, which shows that a thing left behind <the personal belongings 60> exists in the neighborhood, from the first alarm to the user, if the reply signal from the IC tag 61 is received (with reply) (Step S38).

The alarms mentioned above are a combination or one of the following, sound (ring tone)/luminescence/vibration (vibration function)/character/picture.

For example, when setting up sound as an alarm, it is possible to carry out a selection set-up of the type of sound which depends on the request of user.

For instance, the user is able to set-up the music which is downloaded from the website or self recorded voice or a voice message using an automatic voice playback function as a ring tone.

The first alarm and the second alarm should be different sounds. If the first alarm and the second alarm are all set up as a ring tone, the type of ring tone should be different from each other.

Further, it is arbitrary to make the same set-up for the first alarm and the second alarm, and also the first alarm is set up as a sound and the second alarm is set up as a luminescence or vibration.

Furthermore, for example, when setting up a character and a picture as an alarm, it is possible to report as the first alarm "He forgets the wallet!" and as the second alarm "it was found" on the screen with the character and the picture image of the wallet. Such a picture image is able to be downloaded from the website.

Setting change is arbitrarily possible for the user from the screen of the portable telephone, he is able to also set-up a separate alarm to an individual item (object), and various set-ups mentioned above is not limited in particular.

Regardless of whether it is under telephone call, the first alarm and the second alarm is able to be informed, for example, these alarms are able to be displayed on the screen as an interruption indication or a voice alarm, when it is under telephone call.

As mentioned above, the distance by which reader/writer 51 and the IC tag 61 can communicate is about 5 m.

Therefore, the user is able to recognize that left behind personal belongings 60 exist in about 5 m distance (less than 5 m of radius) from the current position.

According to the fourth embodiment of the present invention, the communication system using an IC tag is able to be easily constructed by attaching or equipping the personal belongings with the IC tag of a non-contact method, and equipping a portable telephone with the reader/writer.

Since the IC tag is able to transmit a reply signal by receiving the check signal transmitted from the reader/writer 51 equipped with the portable telephone which is able to convert the received check signal (radio electric wave) into electric power, and drive the IC chip, it does not need to carry a power supply.

According the above, the problem that a system is not able to be used due to a dead battery like before does not occur.

Further, in the fourth embodiment of the present invention, it provides the function which measures the intensity of the signal (reply signal) answered by the portable telephone 50 from the IC tag 61. Based on the receiving intensity of a reply signal, it may control to change automatically volume of ring tone, a luminescence pattern, and vibrating pattern at the time of searching for the personal belongings 60 which is left behind.

The user himself may perform a mode change set-up from the control unit of the portable telephone, or this control mode may be automatically changed by an application program of the portable telephone 50 after reporting the second alarm.

The distance by which the reader/writer 51 and the IC tag 61 can communicate is the composition which is able to be changeable alternatively to two modes such as the 5 m mode and 10 cm mode. When searching, the rough field of search of the personal belongings 60 is recognized in the 5 m mode, and then the pinpoint search of the personal belongings 60 is recognized in the 10 cm mode.

The above-mentioned two modes are not a specific example and do not limit the distance the reader/writer 51 and the IC tag 61 can communicate with each other. For example, when it has a mode change mechanism which is able to be set up in two or more steps, it is possible to be set up arbitrarily by the user.

Although the communication with the IC tag and the reader/writer is able to be temporarily canceled by arbitrary operation of the user, a system starts it again automatically when it becomes the distance which is able to be communicated again.

Figure 13:
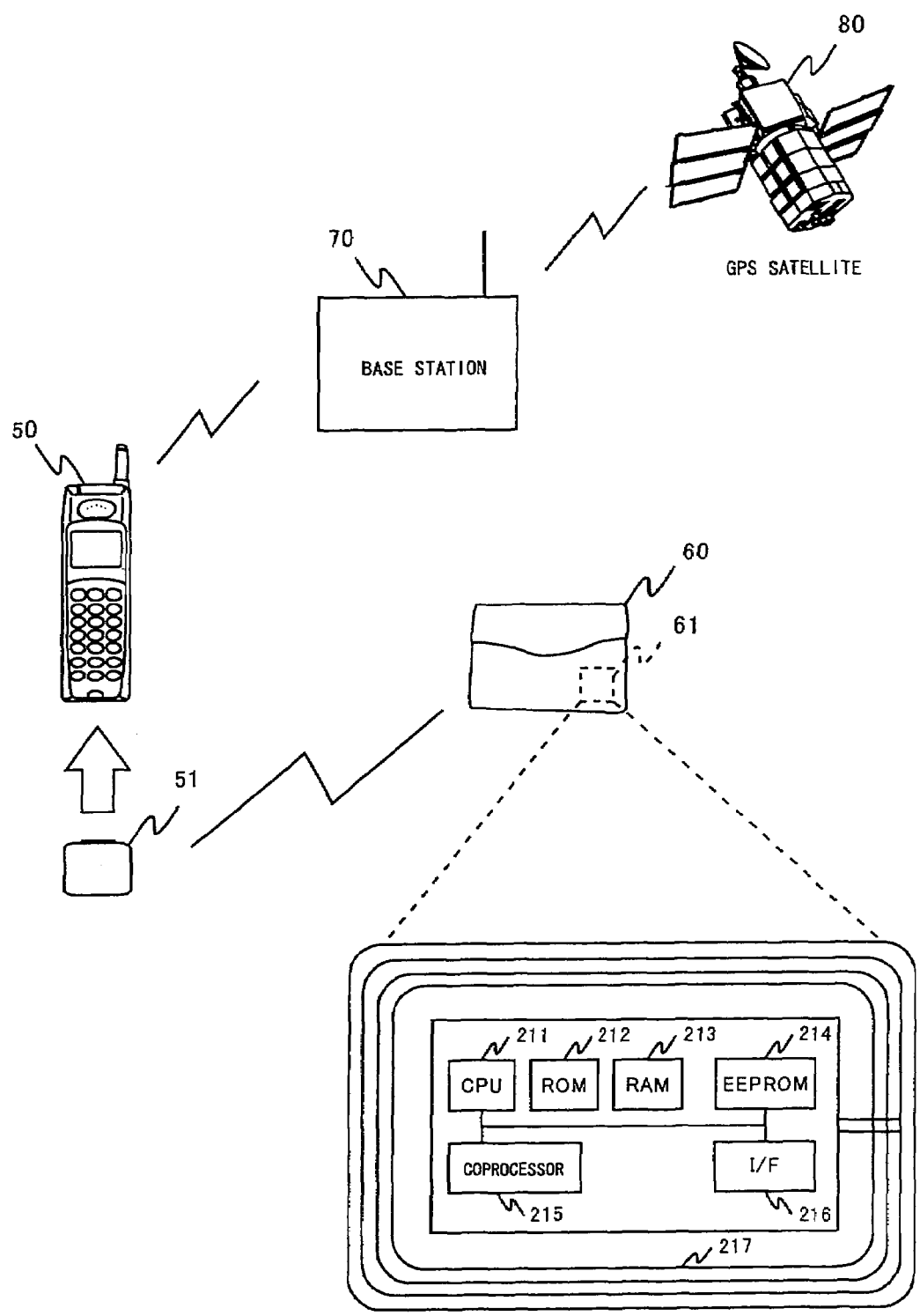
FIG. 13 is a system configuration figure showing the fifth embodiment of the present invention.

FIG. 13 is a figure showing the outline composition of the communication system using the IC tag which is the fifth embodiment of the present invention.

As shown in FIG. 13, in addition to the composition of the fourth embodiment of the present invention mentioned above, the communication system using the IC tag which is the fifth embodiment of the present invention includes a portable telephone 50 which carries a GPS function, a base station 70 and a GPS Satellite 80 which communicates with base station 70.

Although the portable telephone 50 is provided with the usual communication function and possesses a control unit and an indication unit just likes the fourth embodiment of the present invention, it newly carries the GPS function.

The GPS function is a function to detect the self-position information of the portable telephone 50.

Usually, when detecting the self-position information of the portable telephone 50, a GPS signal is transmitted from the portable telephone 50 by predetermined operation, and the detection demand of a self-position is transmitted to the base station 70 after accessing via a wireless-communications transmission network from the portable telephone 50.

When the GPS signal transmitted from portable telephone 50 is caught, the GPS Satellite 80 transmits the position information of the portable telephone 50 (latitude, longitude, altitude) to the base station 70.

The base station 70 transmits the position information transmitted from the GPS Satellite 80 to the portable telephone 50 as address information or map information.

The self-position information of portable telephone 50 is acquirable with the above procedure.

The fifth embodiment of the present invention acquires the self-position information of the portable telephone 50 (equipped with the reader/writer 51) by way of using a GPS function, when communication of the reader/writer 51 and the IC tag 61 becomes impossible, and it notifies the user of the position information via the portable telephone 50.

Figure 14:
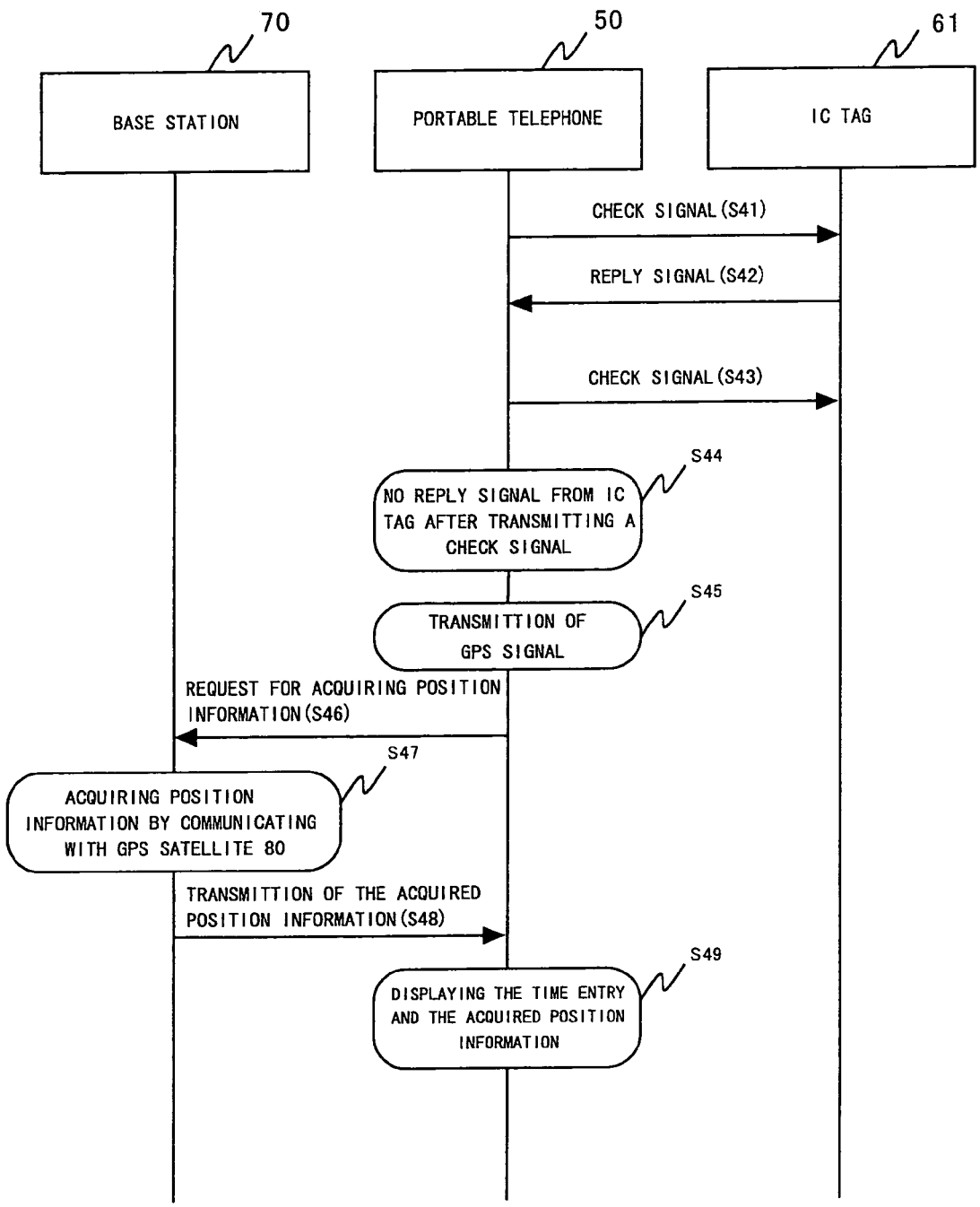
FIG. 14 is a sequence chart which shows the first example of operation by the fifth embodiment of the present invention.

FIG. 14 is a sequence chart which shows the first example of the communication system using the IC tag which is the fifth embodiment of the present invention of operation.

First, portable telephone 50 equipped with the reader/writer 51 transmits a check signal to the IC tag 61 like the first embodiment of the present invention mentioned above (Step S41).

The IC tag 61 transmits a reply signal, when the check signal transmitted via the reader/writer 51 is received (Step S42).

Further, when a reply signal is answered from the IC tag 61 to the check signal transmitted via the reader/writer 51, which is under a condition receivable by the reply signal, it repeatedly carries out the process of above-mentioned Step S41 and Step S42.

Hereafter, the case where the reader/writer 51 and the IC tag 61 become impossible to communication each other is explained.

The portable telephone 50 transmits a check signal to the IC tag 61 again (Step S43).

However, when it is in a communication impossible state because the personal belongings 60 with which the IC tag 61 attached or equipped are left behind, the IC tag 61 is able to neither receive the check signal transmitted via the reader/writer 51 nor transmit a reply signal.

Then, after the portable telephone 50 transmits a check signal via the reader/writer 51, a timer function counts an interval until the timer function receives a reply signal from the IC tag 61. When it exceeds a predetermined value, the portable telephone 50 judges that there is no reply signal (Step S44), and a GPS signal is transmitted by a GPS function (Step S45), and the acquisition request of self-position information is transmitted to the base station 70 (Step S46).

By communication with the GPS Satellite 80, the base station 70 acquires the position information of the portable telephone 50 (latitude, longitude, altitude) (Step S47), and transmits this acquired position information to the portable telephone 50 (Step S48).

The portable telephone 50 displays the time entry which acquired the acquired position information and the position information concerned on a screen, when the position information transmitted from the base station 70 is acquired (Step S49).

Since it is greatly influenced by electric wave environment when acquiring position information, it is related with the acquisition timing of the position information. Therefore, it may be good to acquire the position information immediately after communication with the IC tag 61 becomes impossible. If electric wave environment is bad, it may be good to shift timing for acquiring the position information and start to acquire the position information when electric wave environment becomes good.

Figure 15:
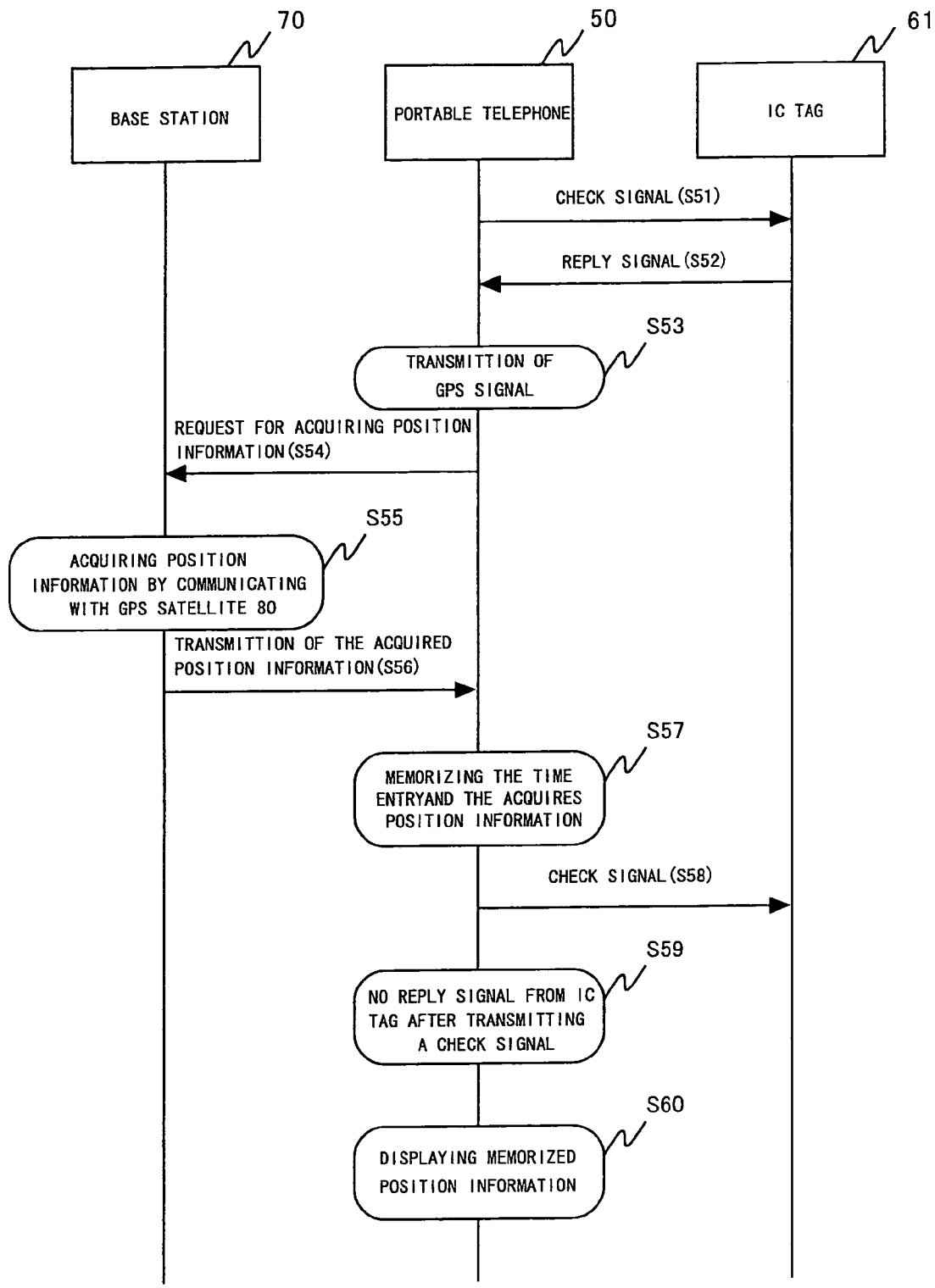
FIG. 15 is a sequence chart which shows the second example of operation by the fifth embodiment of the present invention.

FIG. 15 is a sequence chart which shows the second example of the communication system using the IC tag which is the fifth embodiment of the present invention of operation.

First the portable telephone 50 equipped with the reader/writer 51 transmits a check signal to the IC tag 61 just like the first embodiment of the present invention mentioned above (Step S51).

The IC tag 61 transmits a reply signal, when the check signal transmitted via the reader/writer 51 is received (Step S52).

When the portable telephone receives the reply signal from the IC tag 61 via the reader/writer 51, the portable telephone 50 transmit a GPS signal by a GPS function (Step S53), and transmits the acquisition request of self-position information to the base station 70 (Step S54).

By communication with the GPS Satellite 80, the base station 70 acquires the position information of the portable telephone 50 (latitude, longitude, altitude) (Step S55), and transmits the acquired position information to the portable telephone 50 (Step S56).

The portable telephone 50 memorizes the time entry to which the acquisition request of the acquired position information and the position information is transmitted, when the position information transmitted from the base station 70 is acquired (Step S57).

Further, when a reply signal is answered from the IC tag 61 to the check signal transmitted via the reader/writer 51, which is under a condition receivable by the reply signal, it repeatedly carries out the series process of above-mentioned Step S51 to Step S57.

Hereafter, the case where the reader/writer 51 and the IC tag 61 become impossible to communicate with each other is explained.

In Step S57, when the portable telephone 50 stores the position information and the time information temporarily, it transmits a check signal to the IC tag 61 again (Step S58).

However, when it is in a communication impossible state because the personal belongings 60 with which the IC tag 61 is attached or equipped are left behind, the IC tag 61 is able to neither receive the check signal transmitted via the reader/writer 51 nor transmit a reply signal.

Then, after the portable telephone 50 transmits a check signal via the reader/writer 51, a timer function counts an interval until the timer function receives a reply signal from the IC tag 61. When it exceeds a predetermined value, the portable telephone 50 judges that there is no reply signal (Step S59), and it displays the position information and the time information, which is stored temporarily on the indication unit (Step S60).

According to any of the first example of operation and the second example of operation, the user does not need to perform any particular operation for acquiring the position information of the portable telephone 50, if the mode set-up for acquiring the position information automatically is preliminary done.

Figure 17:
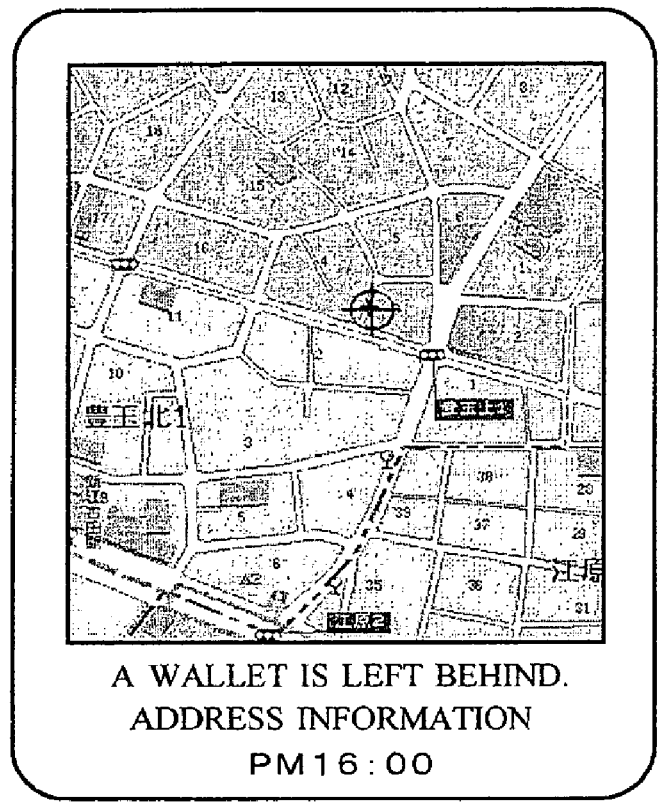
FIG. 17 is a plan showing the second example of the display screen of a portable telephone.

FIGS. 16 and 17 are figures showing the example of the display screen of position information and a time entry displayed on the indication area of a portable telephone.

As shown in the FIG. 16, the information including the phrases "what was left behind? (Bag)", "where did you leave behind a thing? (Address indication)", and "what time did you leave behind a thing? (Time indication)" are displayed on the screen as "thing-left-behind information". In this case, all information on the screen is indicated as text data.

As shown in FIG. 17, the information including the phrases "where did you leave behind a thing? (Map indication)", "what was left behind? (Wallet)", and "what time did you left behind a thing? (Time indication)" are displayed on the screen. In this case, map information is displayed as a graphic data and the other information is displayed as text data.

Regardless of whether it is under telephone call, the above-mentioned indication is good by performing an interruption indication and a voice alarm to report thing-left-behind information, when it is able to display regardless of whether it is under telephone call, for example, is under telephone call, when it is under telephone call.

According to the fifth embodiment of the present invention, when the communication of the reader/writer 51 and the IC tag 61 is impossible, the user is able to gasp easily the position information in which a thing left behind exists by acquiring position information using the GPS function of the portable telephone 50 and displaying the acquired position information on the portable telephone 50.

In the fifth embodiment of the present invention, although GPS function for acquisition of position information shown is one of the examples, the present invention is not limited to the above mentioned example.

Figure 18:
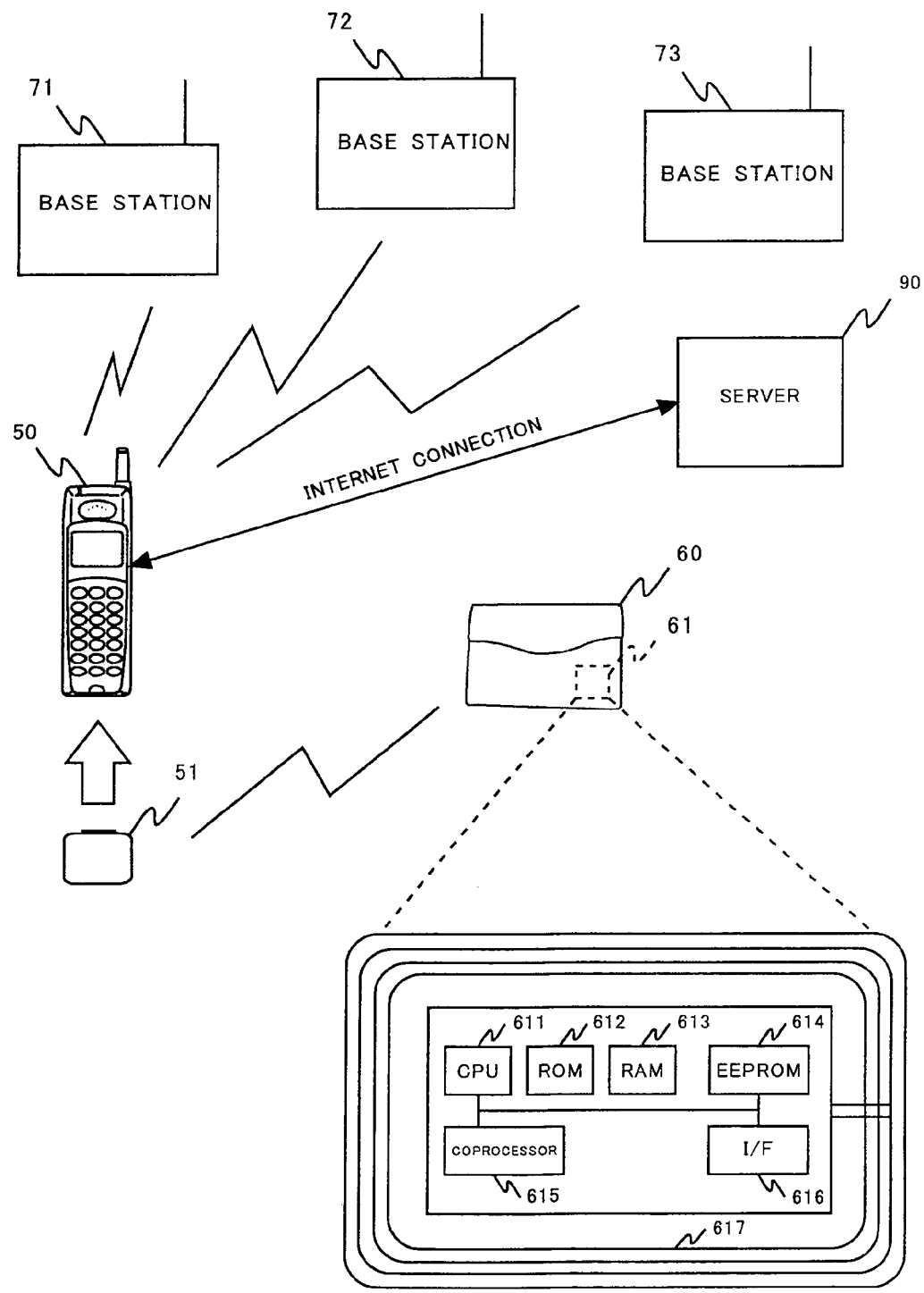
FIG. 18 is a system configuration figure showing the detection of position information about the portable telephone by two or more base stations.

For example, as shown in FIG. 18, the method of detecting the rough position information of the portable telephone 50 from the receiving intensity among two or more base stations 71-73 which transmitted the electric wave for every definite period of time from portable telephone 50 and caught the electric wave concerned is also possible.

In this case, calculation processing of the position information based on the signal strength between two or more base stations (71-73) is carried out by the portable telephone 50 and the server 90 connected with an Internet network.

When the portable telephone 50 detects the self-position information, it accesses the server 90 and acquires the position information.

Further, the embodiment mentioned above is a suitable embodiment for the present invention and it is possible to change within limits which do not deviate from the main point of the present invention variously, and to carry out.

For example, it is also possible to have composition which combined the fourth embodiment and the fifth embodiment of the present invention.

In this case, the first alarm is reported when a thing left behind exists, which means that a communication with the reader/writer 51 and the IC tag 61 is impossible.

Next, after the position information on the portable telephone 50 is displayed on an indication unit by a GPS function, the user goes in search for a thing left behind based on the above-mentioned position information. It is also possible to report the second alarm to the user when the communication with a reader/writer 51 and IC tag 61 is attained.

The information, which included user information such as correlation data of personal belongings, written in the IC tag 61 at the time of initial setting, is also possible to register with the server which managed by the third person organization connected via a communication line network. For example, the information above is to be used as attestation information at the time of the delivery of the lost article in public institutions such as a station and the police.

Although the embodiment mentioned above is explained in the premise of the thing left behind of personal belongings, in case of a theft situation about wallet, it is also possible to use the present system to search for a stolen wallet, if an IC tag is attached on the wallet.

Further, it is possible to prevent a missing child situation by attaching an IC tag on the articles (for example, a label, shoes, clothes, etc.) which a child carries. Even if a child who carries the personal belongings attached with an IC tag is missing temporarily, it is able to search for the missing child easily using the present system.

When it is a tour travel which a tour conductor accompanies, it is also possible to alarm a sound and to display the name in the situation which someone is left in the distance. And it is also possible to use for the number check by a tour conductor and to search for the person who got lost, by attaching an IC tag on a tourist's tour badge and so on.

According to the present system, if a portable phone which has an IC tag attached to it is left behind, it is possible to recognize to have left behind the portable telephone immediately, because the portable telephone rings, emits light or vibrates when the communication of the portable telephone (with the reader/writer) and the IC tag becomes impossible, which means the predetermined distance separates each other.

The present system is also applicable for the shoplifter prevention system by performing correlation processing with the IC tag which attached the IC tag on the goods displayed in a store before opening and possessing the portable phone by the salesclerk.

When a store space is large, it is also possible to be made to perform the correlation process with the goods and the IC tag in two or more steps separately.

It is also possible to use as a management server when employing the communication system using the IC tag shown in the fourth and fifth embodiments of the present invention that mentioned above server 90 shown in FIG. 18 as the sixth embodiment of the present invention. In that case, the information written in the IC tag (IC seal) at the time of initial setting is registered into the management server via communication lines (Internet etc.), then the alarm information and the position information are transmitted to a management server at the time of article loss, or transmitted and registered automatically or manually after predetermined time passes.

The user who lost an article is able to access from a personal computer or a mobile terminal under the environment which is able to access to the management server other than the portable telephone which owner is not the user and the present condition of a lost article is able to be checked using the website (program) for which it is provided by the system management company.

When a lost article is discovered, it is automatically or manually notified to the management server that it is re-acquired.

The user receives grant of the IC tag from system management side beforehand, and registers personal information such as owner address information, a name, a contact, a password, etc. into the management server.

As mentioned above, a different serial number for every IC tag is memorized in the IC tag. Also, the URL information which is the access information to the management server or contact information of a system management company is memorized in the IC tag.

Regarding the matter of this contact information, for example, it is made to write in later or may be made to carry out by a bar code indication or printing on the surface of the IC tag so that the finder of a lost article is able to check by viewing.

Therefore, the finder of a lost article is able to easily access the system management side and be notified about the lost article by using a reader/writer, a bar code reader, or a character reading function such as OCR to read URL information of the management server or contact information of the system management company, etc. which are printed or recorded on the IC tag currently attached on the lost article.

Further, the finder is not necessary to access the program sponsored by the system management company and to necessarily submit notice, and also the finder may contact the owner of a lost article directly by telephone.

When the information about a lost article is sent to the management server, which is a system management side, it provides the information on lost article discovery to the user who is an owner of the lost article and can determine the details about the plan of delivery schedule, etc.

In this case, it is also possible to perform arrangements which send a lost article to the user who is an owner, or to instruct so that it may be made to dispose, if a lost article is unnecessary for the owner of a lost article.

Although the sixth embodiment of the present invention above shows the case where a third party finds a lost article, for example, apparatuses which is able to communicate with the IC tag, just like the reader/writer function mentioned above, are placed beforehand in every place, (such as a telegraph pole, a building, a town, or a station), and it makes possible to constitute the system which applies for the case of a theft.

In this case, the information detected by the reader/writer transmits the information about a lost article to a management server immediately, and contacts the user who is an owner.

The system management side is also able to publish the lost article inquiry information from the user who built the bulletin board corner on the Web using the management server, and disclose lost article information.

In this case, the system management side is made to promptly connect to the user who is an owner, when it searches whether there is any notification of the lost article corresponding to information with writing and there is a notification of an applicable lost article about it.

Furthermore, in case that the portable telephone itself is lost, which means communication with other properties which related beforehand is impossible, it controls so that a lock function starts automatically after a definite-period-of-time progresses in order to prevent the unauthorized use of the portable telephone by a finder In this case, on the screen of a portable telephone, the contact information of a system management company is displayed and position information and time information are further transmitted for every definite period of time.

Therefore, the unauthorized use by a finder is able to be prevented, and the user can access a management server and check the position information on the portable telephone.

It is possible to distribute by the method of marketing CD-ROM which recorded the application program about use of such a system, or selling on a network.

INDUSTRIAL APPLICABILITY

As mentioned above, the communication system concerning the present invention is useful as a security system using the information acquisition system which improves the use added value in various business scenes using the business card which attached the IC tag etc., or using the IC tag.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

The invention claimed is:

1. A communication system comprising:
   an IC tag attached to an object;
   a reader/writer provided with a function for communicating with the IC tag for a predetermined time;
   a mobile information terminal for carrying the reader/writer;
   wherein the mobile information terminal comprises the functions of:
   a first alarm emission function for emitting a first alarm when communication with the reader/writer and the IC tag becomes impossible;
   a second alarm emission function for emitting a second alarm when communication with the reader/writer and the IC tag becomes possible;
   a position information acquisition function for acquiring a position information of the mobile information terminal when communication with the reader/writer and the IC tag becomes impossible; and
   a display function for displaying the position information acquired by the position information acquisition function,
   wherein said first alarm and said second alarm are different and are selected from the group of alarms consisting of sound, luminescence, vibration and screen information, or its combination, and wherein the setting change is arbitrarily possible from the mobile information terminal.

2. The communication system according to claim 1, wherein the mobile information terminal suitably changes a timing for acquiring the position information by the position information acquisition function in accordance with an electric wave environment when communication of the reader/writer and the IC tag becomes impossible.

3. The communication system according to claim 1, wherein the IC tag provides a unique identification number and setting change of correlation data with the object being arbitrarily possible via the reader/writer from the mobile information terminal.

4. The communication system according to claim 2, wherein the position information acquisition function receives electric wave intensity with two or more base stations and acquires the position information based on said received electric wave intensity with two or more base stations.

5. The communication system according to claim 2, wherein the position information acquisition function communicates with a GPS Satellite via base stations for acquiring the position information.

6. The communication system according to claim 1, wherein said system further comprises a communication line and a management server, and wherein said communication line connects said mobile information terminal with said management server and provides the function for transmitting the first alarm and the position information acquired by the position information acquisition function to the management server.

7. The communication system according to claim 6, wherein the management server provides information program about the communications system using the IC tag and offers information about a lost article in the information program for a terminal device accessible via the communication line.

8. A communication program applied to a communication system including an IC tag attached to an object, a reader/writer provided with a function for communicating with the IC tag for a predetermined time, and a mobile information terminal for carrying the reader/writer;
  wherein the mobile information terminal comprises the following processes:
  a first alarm emission process for emitting a first alarm when communication with the reader/writer and the IC tag becomes impossible;
  a second alarm emission process for emitting a second alarm when communication with the reader/writer and the IC tag becomes possible;
  a position information acquisition process for acquiring a position information of the mobile information terminal when communication with the reader/writer and the IC tag becomes impossible; and
  a display process for displaying the position information acquired by the position information acquisition process,
  wherein said first alarm and said second alarm are different and are selected from the group of alarms consisting of sound, luminescence, vibration and screen information, or its combination, and wherein the setting change is arbitrarily possible from the mobile information terminal.

9. The communication program according to claim 8 and further including a management server and a communication line, wherein said communication line connects said mobile information terminal with said management server and provides a process for transmitting the first alarm and the position information acquired by the position information acquisition process to the management server.

10. The communication program according to claim 8, wherein the mobile information terminal provides a process for restricting functions of the mobile information terminal when the mobile information terminal is in a missing condition.

11. The communication program according to claim 8, wherein the position information acquisition process changes the acquisition timing of the position information according to an electric wave environment.

12. A communication system comprising:
  an IC tag attached to an object;
  a reader/writer provided with a function for communicating with the IC tag for a predetermined time; and
  a mobile information terminal for carrying the reader/writer;
  wherein the mobile information terminal emits a first alarm when communication with the reader/writer and the IC tag becomes impossible, emits a second alarm when communication with the reader/writer and the IC tag becomes possible; and
  wherein the first alarm and the second alarm are different and are selected from the group of alarms consisting of sound, luminescence, vibration and screen information, or its combination, and wherein the setting change is arbitrarily possible from the mobile information terminal.

13. The communication system according to claim 12, wherein the mobile information terminal detects and temporarily memorizes the position information of the mobile information terminal when communication with the reader/writer and the IC tag is possible, and displays the temporarily memorized position information when communication with the reader/writer and the IC tag becomes impossible.

14. A communication system comprising:
  an IC tag attached to an object;
  a reader/writer provided with a function for communicating with the IC tag for a predetermined time; and
  a mobile information terminal for carrying the reader/writer having a position information;
  wherein the mobile information terminal detects and temporarily memorizes the position information of the mobile information terminal when communication with the reader/writer and the IC tag is possible, comprises a first alarm emission function for emitting a first alarm when communication with the reader/writer and the IC tag becomes impossible, and displays the temporarily memorized position information, and comprises a second alarm emission function for emitting a second alarm when communication with the reader/writer and the IC tag becomes possible, said first alarm and said second alarm being different and are an alarm selected from the group consisting of sound, luminescence, vibration and screen information, or its combination, and wherein setting change being arbitrarily possible from the mobile information terminal.

15. The communication system according to claim 14, wherein the IC tag provides a unique identification number and arbitrarily sets change of correlation data with the object via the reader/writer from the mobile information terminal.

16. The communication system according to claim 14, and further comprises two or more base stations and wherein the mobile information terminal detects and temporarily memorizes the position information of the mobile information terminal using said two or more base stations when communication with the reader/writer and the IC tag is possible, and displays the temporarily memorized position information when communication with the reader/writer and the IC tag becomes impossible.

17. The communication system according to claim 14, wherein the mobile information terminal includes a GPS function comprising a GPS satellite and base stations, and detects and temporarily memorizes the position information of the mobile information terminal by communicating with said GPS satellite via said base stations, and displays the temporarily memorized position information when communication with the reader/writer and the IC tag becomes impossible.

18. The communication system according to claim 17, wherein the mobile information terminal acquires the position information of the mobile information terminal by communicating with the GPS Satellite and the base stations whenever communication with the reader/writer and the IC tag is performed, overwrites and updates the acquired position information on the temporarily memorized position information.

19. A communication program applied to a communication system including an IC tag attached to an object, a reader/writer provided with a function for communicating with the IC tag for a predetermined time, and a mobile information terminal for carrying the reader/writer; wherein the mobile information terminal comprises the processes of:

a communication control process for controlling communication with the reader/writer and the IC tag; and a position information detection/memory process for detecting the position information of the mobile information terminal and temporarily memorizes the detected position information when communication with the reader/writer and the IC tag is possible, wherein the mobile information terminal detects and temporarily memorizes the position information of the mobile information terminal when communication with the reader/writer and the IC tag is possible, comprises a first alarm emission function for emitting a first alarm when communication with the reader/writer and the IC tag becomes impossible, and displays the temporarily memorized position information, and comprises a second alarm emission function for emitting a second alarm when communication with the reader/writer and the IC tag becomes possible, said first alarm and said second alarm are different and are an alarm selected from the group consisting of sound, luminescence, vibration and screen information, or its combination, and wherein setting change being arbitrarily possible from the mobile information terminal.

* * * * *